United States Patent [19]

Yanagisawa et al.

[11] Patent Number: 5,182,724
[45] Date of Patent: Jan. 26, 1993

[54] INFORMATION PROCESSING METHOD AND INFORMATION PROCESSING DEVICE

[75] Inventors: Yoshihiro Yanagisawa, Atsugi; Kunihiro Sakai, Isehara; Osamu Takamatsu, Atsugi; Ken Eguchi, Yokohama; Hiroshi Matsuda, Isehara; Hisaaki Kawade, Yokohama; Toshihiko Takeda, Atsugi, all of Japan

[73] Assignee: Canon Kabushiki Kaisha, Tokyo, Japan

[21] Appl. No.: 579,041

[22] Filed: Sep. 7, 1990

[30] Foreign Application Priority Data

Sep. 7, 1989 [JP] Japan ................................ 1-233652
Apr. 18, 1990 [JP] Japan ................................ 2-104059
Aug. 3, 1990 [JP] Japan ................................ 2-206606

[51] Int. Cl.$^5$ ........................ G11C 13/00; G11B 9/00
[52] U.S. Cl. .................................... 365/151; 369/126
[58] Field of Search ........................ 365/151, 174, 118; 369/126

[56] References Cited

U.S. PATENT DOCUMENTS

| | | | |
|---|---|---|---|
| 4,575,822 | 3/1986 | Quate | 365/174 |
| 4,962,480 | 10/1990 | Ooumi et al. | 365/151 |
| 5,038,322 | 8/1991 | Van Loenen | 365/151 X |

FOREIGN PATENT DOCUMENTS

| | | |
|---|---|---|
| 0272935 | 6/1988 | European Pat. Off. |
| 0307211 | 3/1989 | European Pat. Off. |
| 0325056 | 7/1989 | European Pat. Off. |
| 63-161552 | 7/1988 | Japan |
| 63-161553 | 7/1988 | Japan |
| 63-204531 | 8/1988 | Japan |
| 64-53363 | 3/1989 | Japan |
| 64-53364 | 3/1989 | Japan |
| 1-154332 | 6/1989 | Japan |

OTHER PUBLICATIONS

Binnig, et al., "Scanning Tunneling Microscopy," Halvetica Physica Acta, vol. 55, (1982), pp. 726 through 735.

*Primary Examiner*—Joseph A. Popek
*Attorney, Agent, or Firm*—Fitzpatrick, Cella, Harper & Scinto

[57] ABSTRACT

Recording, reproduction or erasing of information is performed on a recording medium having a recording layer provided on an electrode substrate. The electrode substrate has a regular periodic structure within a plane and the structure is detected through the recording layer by use of a probe electrode to determine a desired position on the recording medium.

36 Claims, 8 Drawing Sheets

POSITIONAL
INFORMATION

```
A ⊕           +A'
B +
C +           +C'
D +
E +           +E'
F +
G +           +G'
H +
I +           +I'
```

COORDINATE   RECORDING
AXIS         POSITION

```
A ⊕     +A'  +A"  +A'"  +A""
B +
C +     +C'  +C"  +C'"  +C""
D +
E +     +E'  +E"  +E'"  +E""
F +
G +     +G'  +G"  +G'"  +G""
H +
I +     +I'  +I"  +I'"  +I""
```

COORDINATE    RECORDING
AXIS          POSITION

INFORMATION PROCESSING METHOD AND INFORMATION PROCESSING DEVICE

BACKGROUND OF THE INVENTION

1. Field of the Invention

This invention relates to a novel information processing method and information processing device, which can perform recording and reproduction at high density and high precision, and also can perform erasing of information at high precision.

2. Related Background Art

In recent years, the use of memory materials form the nucleus of electronics industries such as computers and related instruments thereof, video discs, digital audio discs, etc., and developments of their materials have actively progressed. Performances demanded for memory materials, which may differ depending on uses, may be generally as follows: (1) high density and large recording capacity; (2) quick response speed in recording and reproduction; (3) small consumption of power; (4) high productivity and low cost, etc.

In the past, semiconductor memories or magnetic memories employing magnetic materials or semiconductors as the base materials have been predominantly used, but in recent years, with the progress of laser techniques, a recording medium of low cost and high density according to optical memory by use of an organic thin film such as an organic dye, photopolymer is launched into the area.

On the other hand, recently, a scanning tunnel microscope (hereinafter abbreviated as STM) which observes directly the electron structure of the surface atom of a conductor has been developed [G. Binnig et al, Helvetica Physica Acta, 55, 726 (1982)], whereby it has become possible to measure real spatial images of high resolution irrespectively of whether they are single crystalline or amorphous. Besides, it has the advantage that observation can be done at low power without giving damage with current to the medium, and further it can be actuated in air and therefore used for various materials. For such reasons, a wide scope of applications has been expected.

STM utilizes the phenomenon that tunnel current flows when a probe of metal (probe electrode) and an electroconductive substance are approached to a distance of about 1 nm with application of a voltage therebetween. This current is very sensitive to the change in distance between both, and by scanning the probe so as to maintain the tunnel current constant, the surface structure of the real space can be drawn and at the same time various information concerning the whole electron cloud of the surface atoms can be read. In this case, resolution in the interplanar direction is about 1 Å. Accordingly, by applying the principle of STM, it is possible to perform high density recording and reproduction sufficiently at an atomic order (several Å). As the recording and reproduction method in this case, there have been proposed the method in which recording is performed by changing the surface state of an appropriate recording layer by use of a high energy electromagnetic wave such as particulate rays (electron beam, ion beam) or X-ray, etc. and an energy ray such as visible, UV-ray, etc. and reproduction is effected by STM (Japanese Laid-open Patent Application No. 63-204531), or the method in which a material having a memory effect as to the switching characteristics for voltage or current such as a thin film layer of a $\pi$-electron type organic compound or a chalcogenide is used as the recording layer, and recording and reproduction are performed by use of STM, etc. (Japanese Laid-open Patent Application Nos. 63-161552, 63-161553).

All of these methods are undoubtedly approaches which enable high density recording which make avail of the characteristics of STM, but such higher densification depends greatly on the scanning precision and the positional control precision of the probe electrode in the interplanar direction of a recording surface (X,Y directions). Presently, a fine movement mechanism of a probe electrode (fine adjustment mechanism) is one utilizing a piezoelectric actuator by use of a piezoelectric element, but there is the problem of hysteresis of a piezoelectric body, which is an obstacle against higher densification of recording. Further, the mechanism of fine adjustment or scanning in the X,Y directions of a probe electrode is not necessarily sufficient generally with respect to perpendicularity of the X-axis and Y-axis. In other words, there is a problem in fine adjustment of the probe electrode or the position reproducibility of the probe electrode during recording and reproduction. As a means for solving such a problem, it may be conceivable to prepare a scale which becomes the standard relative to the position and the direction on the recording medium, detecting the information concerning the position and the direction from such measure, and performing recording and reproduction at the position corresponding to the positional information detected. Such a method has been employed in the recording and reproduction system by VTR, and also in the recording system generally classified into the high density recording system in these days, such as an optical disc or optical card. In this case, with accompaniment of higher densification and more fineness of recording, more fine information must be written and detected as a matter of course. As such fine position detecting means, the optical method, the magnetic method or the electrostatic capacity system method can be included, and among them, one which can obtain the highest resolution is the optical method by use of the principle of lattice interference. This permits a monochromatic light to be incident on a diffraction lattice as the standard scale, permits the primary diffracted light diffracted to be synthesized and interfered, converts the obtained light and dark coherent light photoelectrically by a photodetector, and detects the relative deviation amount between the optical system and the standard scale from the lightness and darkness of the coherent light.

However, in the prior art example as mentioned above, the performance (resolving ability) of the lattice interference optical position detection method is determined primarily from the lattice pitch, and it is important how it can be made and detected with good precision, and in the precise working techniques under the present situation (EB pattern drawing or ion beam working), a precision of at most 0.01 $\mu$m (=100 Å) is the limit, and also a resolving ability of 0.01 $\mu$m is the limit in the detection technique (optical heterodyne method).

Therefore, there has been involved the problem in recording and reproduction by use of STM that precision is markedly inferior and also complicated steps are necessary for lattice preparation.

For this reason, in recording and reproduction by use of STM, there has been made a proposal which utilizes an atomic period based on the regular atomic arrangement within the recording medium plane (Japanese Laid-open Patent Applications Nos. 1-53363 and 1-53364 for tracking). However, concerning the proposal in Japanese Laid-open Patent Application No. 1-53363, the site for detecting the coordinate axis and the site for performing recording and reproduction are different, and the operations at the both sites are performed with one probe, whereby there is involved the problem that the precision of probe control is reflected in the precision of recording and reproduction position detection. On the other hand, concerning the proposal in Japanese Laid-open Patent Application No. 1-53364, there is the problem that the device is complicated, because a probe for detecting the coordinate axis and a probe for performing recording and reproduction are independently necessary.

SUMMARY OF THE INVENTION

Accordingly, an object of the present invention is to provide an information processing method in an electrical high density recording-reproduction-erasing system by use of a probe electrode, which can perform recording and reproduction of information at high density and high precision, and also can perform erasing of the information at high precision by introducing a position detecting function and a position controlling function of high precision.

It is another object of the present invention to provide an information processing device which performs recording, reproduction and erasing and is yet reduced in reproduction error.

The above objects can be accomplished by the present inventions as specified below.

In one aspect, the present invention provides an information processing method, which comprises preparing a recording medium having a recording layer provided on an electrode substrate having a regular periodic structure within a plane, detecting a position on the periodic structure of the substrate through the recording layer by use of a probe electrode and performing recording, reproduction or erasing of information at a desired position on the recording layer corresponding to the position detected.

In another aspect, the present invention provides an information processing method, which comprises preparing a recording medium having a recording layer provided on an electrode substrate having a regular periodic structure within a plane, detecting a position on the periodic structure of the substrate through the recording layer by use of at least one probe electrode (first probe electrode) of a plurality of electrodes and performing recording, reproduction or erasing of information at a desired set position on the recording layer corresponding to the position detected by use of at least one probe electrode (second probe electrode).

In still another aspect, the present invention provides an information processing method, which comprises preparing a recording medium having a recording layer provided on an electrode substrate having a regular periodic structure within a plane, detecting a position on the periodic structure of the substrate through the recording layer by use of at least one probe electrode (first probe electrode) of a plurality of electrodes, performing recording, reproduction or erasing of information at any desired set position on the recording layer corresponding to the position detected by use of at least one probe electrode (second probe electrode), detecting the amount of change in distance between the probe electrode and the recording medium by use of at least one probe electrode (third probe electrode), and controlling the distance between the second probe electrode and the recording medium surface based on &he amount of change.

In still another aspect, the present invention provides an information processing device, comprising a recording medium provided with a recording layer on an electrode substrate having a regular periodic structure within a plane and a plurality of probe electrodes at positions opposed to said recording medium, said device being provided with a means for detecting a position on the periodic structure of the electrode substrate through said recording layer by use of at least one probe electrode (first probe electrode), and a means which performs recording of information onto the recording layer, reproduction of recorded information or erasing of recorded information by use of at least one probe electrode (second probe electrode) at a desired set position on the recording layer corresponding to the detected position.

In still another aspect, the present invention provides an information processing device, comprising a recording medium provided with a recording layer on an electrode substrate having a regular periodic structure within a plane and a plurality of probe electrodes at positions opposed to said recording medium, said device being provided with a means for detecting a position on the periodic structure of the electrode substrate through said recording layer by use of at least one probe electrode (first probe electrode), a means which performs recording of information onto the recording layer, reproduction of recorded information or erasing of recorded information by use of at least one probe electrode (second probe electrode) at a desired set position on the recording layer corresponding to the detected position, a means for detecting the amount of change in distance between the probe electrode and the recording medium by use of at least one probe electrode (third electrode) and a means for controlling the distance between the second probe electrode and the recording medium surface based on the amount of change.

DETAILED DESCRIPTION OF THE PREFERRED EMBODIMENTS

The position detection in the present invention utilizes the phenomenon that a tunnel current flows depending on the work function of the electroconductive substance when an electroconductive probe (probe electrode) and an electroconductive substance are made proximate to a distance between the two of about 1 nm while applying a bias voltage therebetween similarly as in recording and reproduction of information. In the present invention, the recording layer is formed on a substrate (electrode substrate), but the electron state of the substrate which is an electroconductive substance can be directly observed even if there may be a recording layer between the probe electrode and the substrate by setting suitably the observation conditions. By utilizing this, for a recording medium having a regular atomic arrangement on the substrate surface or a standard original point arbitrarily formed, a positional coordinate is introduced based on such regular atomic arrangement or the standard original point, and the change in the characteristic tunnel current corresponding to such positional coordinate is detected to thereby detect the position. At the same time, based on such positional detection results, recording, reproduction or erasing positions on the recording layer exhibiting relative positional relationship to the positional coordinate system are specified, simultaneously with positional control of the probe electrode onto the recording, reproduction or erasing position.

Figures 6, 7, 8:
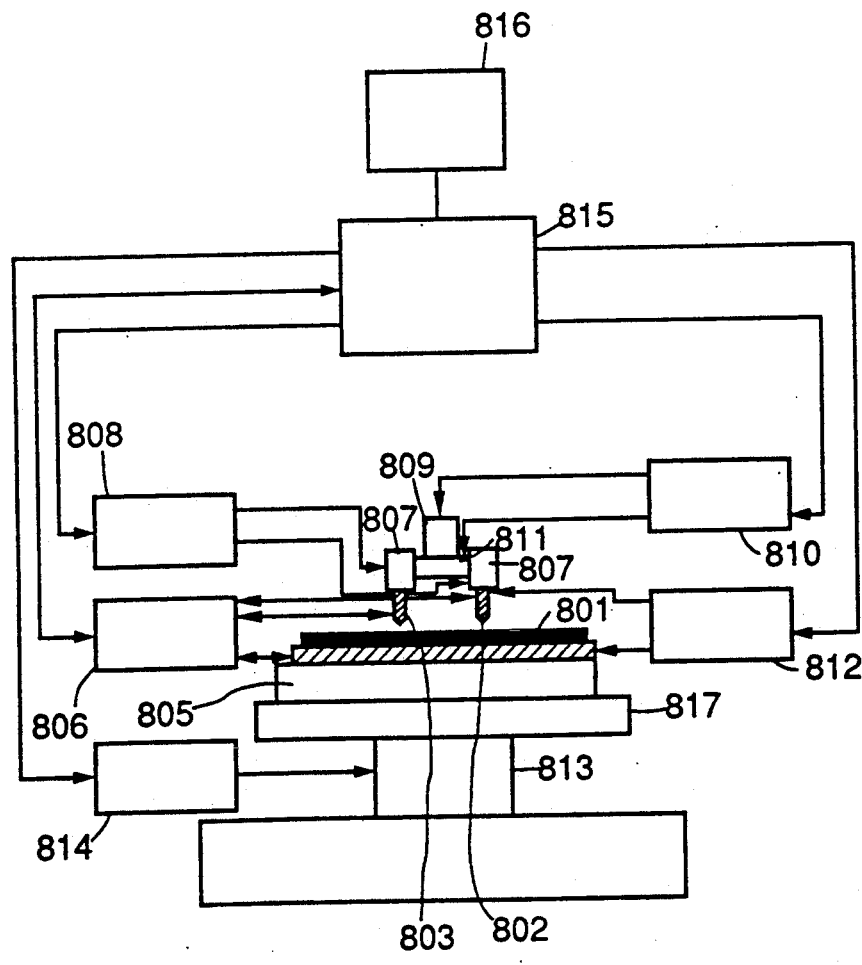
FIG. 6 and FIG. 7 are principle illustrations showing the positional relationship between the coordinate axis and the recording position of the present invention.
FIG. 8 is a block diagram showing diagramatically the information processing device of the present invention.

FIG. 6 shows a schematic diagram showing the positional relationship between the coordinate axis and the recording position at this time. That is, the positional informations (A-I) as the measure on the coordinate axis are constantly in relative positional relationship (A-A', etc.) to the recording positions (A'-I'). Accordingly, by detecting the positional informations A-I, the recording positions of A'-I' can be necessarily specified. In this case, the respective points on the coordinate axis (scale) are not required to take relative positions definitely. For example, as shown in FIG. 7, the recording positions corresponding to the positional information A may also exist in a plural number as A'', A''', . . . other than A' of course, definite (1:1 correspondence) relationship is desirable in precision. Also, the coordinate axis is not required to be one, but a plurality of axes can be used, or otherwise it is not required to be one-dimensional but may also be two-dimensional (network system). In this case, corresponding to the respective lattice points of the two-dimensional coordinate system, the recording positions are also arranged two-dimensionally.

<Coordinate axis>

The coordinate axis as the positional detection system to be used in the present invention is formed by use of the regular atomic arrangement possessed by the electrode substrate. As the electrode substrate having such a regular atomic arrangement, an electroconductive material of which lattice constants have been previously known namely various metals or graphite single crystals, etc. can be utilized. Otherwise, since the tunnel current to be utilized in the present invention is on the order of about nA, the above-mentioned electroconductive materials may have an electroconductivity of $10^{-10}$ ($\Omega.cm^{-1}$) or more, and therefore single crystals of the so called semiconductor such as silicon, etc. also can be used. Among them, as representative examples, metal samples are considered. Now, if a voltage V lower than the work function $\phi$ is applied between the probe electrode and the above metal sample with a distance of Z apart from each other, it has been known that electrons will tunnel through the potential barrier. When the tunnel current density $J_T$ is determined by free electron approximation, it can be represented as:

$$J_T = {}^*\beta V/2\pi\lambda Z)\exp(-2Z/\lambda) \qquad (1)$$

wherein $\lambda = h/\sqrt{2m\phi}$: attenuation distance of wave function in vacuum or air outside of metal
  $h = \gamma/2\pi\gamma$: Planck's constant m: mass of electron
  $B = e^2/h$ e: electron charge.

In the formula (1), if Z is a constant value $Z = Zc$, the tunnel current density $J_T$ will vary depending on the work function $\phi$ of the standard atomic arrangement. Therefore, if the probe electrode is scanned in any desired linear direction on such a metal sample surface while maintaining $Z = Zc$, the tunnel current will vary periodically following the metal atomic arrangement. Here, if a metal with lattice constants previously known is used, the atomic arrangement state in any desired direction with a certain lattice point on any desired crystal surface is self-explanatory, and the change in the periodic tunnel current obtained when scanning the probe electrode can be sufficiently predicted. Therefore, if the scanning direction of the probe electrode is corrected so that the predicted value of such tunnel current change may take an equal value to the measured value of the tunnel current change obtained by practical scanning of the probe electrode, the movement of the probe electrode will become one along the atomic arrangement of the sample. In other words, if the atomic arrangement is regarded as the coordinate axis, the probe electrode will move on the coordinate axis.

Next, description is made about the standard original point. As described above, a definite coordinate system can be set on the recording medium by use of an atomic scale utilizing a regular atomic arrangement, but in this case, the original point of the coordinate system can be determined with difficulty. On the other hand, as already described, recording and reproduction of the present invention are practiced by detecting the change of the work function of the recording medium surface as the change amount of the tunnel current. Therefore, if the surface state of any desired position on the recording medium is artificially changed, with that position being introduced as the original point (standard original point), a coordinate system concerning the position can be introduced on the recording medium. In this case, by provision of a plurality of standard original points, the axis direction of such a coordinate system can be determined. Also, by using the atomic scale as previously mentioned in combination, since the axis direction of the coordinate system is definitely determined, it is possible to set the absolute coordinate on the surface of the recording medium even if the standard original point may be one. Anyway, by use of a plurality of these standard scales, the precision concerning positional detection is improved. As the standard original point, it may be conceivable to introduce it by forming unevenness on the recording medium surface by such a method as etching, etc., or arrangement of other atoms partially selectively on the medium surface, etc. by such a method as ion implantation, but since these are all inferior in precision as the standard original point for resolving ability of STM under the present situation, they should be suitably utilized for rough grasping of the positions. Under the present situation, the method of writing some information concerning the original point in a part of the recording surface of the recording medium prior to practicing actual recording of a desired information and making such a point as the standard original point is excellent in both precision and ease of preparation.

For detection of the atomic structure of the electrode substrate through the recording layer by use of a probe electrode, appropriate conditions are necessary.

First, the thickness of the recording layer should be desirably as thin as possible, such as 1 μm or less, preferably 500 Å or less, more preferably 100 Å or less.

Otherwise, it is also necessary to select and use suitable values for the bias voltage V to be applied between the probe electrode and the electrode substrate and for the tunnel current density $J_T$.

In determining the optimum values for these values, no complete theory has been established up to date, but according to the investigations by the present inventors, it is desirable that either one or both of the relationships shown below should be valid between the absolute value $|V(sub)|$ of the bias voltage applied between the probe electrode and the substrate and the tunnel current $J_T(sub)$ in detecting the atomic structure of the substrate, and the absolute value $|V(ads)|$ of the bias voltage applied between the probe electrode and the substrate and the tunnel current $J_T(ads)$ in detecting the structure (state) of the recording layer surface:

$$|V(sub)| < |V(ads)|$$

$$J_T(sub) \, J_T(ads).$$

Specific value of $|V(sub)|$ may be 1 V or less, preferably 500 to 20 mV.

As described below, since all of recording, reproduction and erasing are performed electrically (by voltage application), $|V(sub)|$ is required to be selected to have a value at which no recording or erasing of information onto recording layer may occur by voltage application. However, for example, when the recording layer is formed of an LB film, there is no problem if it is 1 V or less.

On the other hand, as to $J_T(sub)$, when the probe electrode is scanned while maintaining constantly $Z=Zc$ in the formula (1), the value of $J_T(sub)$ will vary depending on the atomic arrangement of the electrode substrate as a matter of course, but its average value should be set to about 100 pA to 10 nA, more preferably about 500 pA to 3 nA.

The values of V(sub) and $J_T$(sub) as mentioned above are no more than an example, and other conditions may be available.

As described above, when a part or all of the electrode substrate has a regular atomic arrangement, an also its arrangement state is already known, it is possible to set an X-Y coordinate system exhibiting a definite relative relationship to the coordinate axis utilizing crystal lattices of such atomic arrangement on the recording layer deposited on the electrode substrate. The recording site and the positional detection site on the recording medium should be desirably separated from each other.

<Recording medium>

As the recording medium to be used in the present invention, one comprising a substrate (electrode substrate) and a recording layer provided thereon, and yet having the memory-switching phenomenon (electric memory effect) in the current-voltage characteristics can be utilized.

The electric memory effect as mentioned in the present invention refers to at least two different resistance states corresponding to voltage application, which respective states are freely transitionable to each other by application of a voltage or a current exceeding the threshold value which changes the electroconductivity of the recording layer, and which respective states obtained are capable of retaining their states so long as a voltage or a current not exceeding the threshold value is applied.

Specific examples of the material constituting the recording layer may include those as set forth below.

(1) There can be employed amorphous semiconductors such as oxide glass, borate glass or chalcogenide glass containing Se, Te, As compounded with an element of the group III, IV, V, VI of the periodic table. They are intrinsic semiconductors with an optical band gap Eg of 0.6 to 1.4 eV or an electric activation energy ΔE of about 0.7 to 1.6 eV. Specific examples of the chalcogenide glass may include As-Se-Te type, Ge-As-Se type, Si-Ge-As-Te type such as $Si_{16}Ge_{14}As_5Te_{65}$ (suffixes are atomic %), or Ge-Te-X type, Si-Te-X type (X=small amount of group V, VI element) such as $Ge_{15}Te_{81}Sb_2S_2$, etc.

Further, an Ge-Sb-Se type chalcogenide glass also can be employed.

In the amorphous semiconductor layer having the above-mentioned compound deposited on the electrode, the electric memory effect of the medium can be exhibited by application of a voltage by use of a probe electrode in the vertical direction to the film surface.

As the deposition method of such material, thin film forming techniques known in the art can be employed to accomplish sufficiently the objects of the present invention. For example, as preferable film formation methods, the vacuum vapor deposition method and the cluster ion beam method can be included. Generally, the electric memory effect of such material has been observed with a film thickness of several μm or less, but a film thickness of 1 μm or less is preferable from the standpoint of uniformity or recordability, more preferably a film thickness of 500 Å or less.

Also, from the standpoint of recording resolving ability as the recording medium, the recording layer should be desirably as thin as possible, and a more preferable film thickness is within the range of from 30 Å to 200 Å.

(2) Further, there can be employed organic semiconductor layers having an electron accepting compound such as tetracyanoquinodimethane (TCNQ), TCNQ derivatives such as tetrafluorotetracyanoquinodimethane (TCNQF$_4$), tetracyanoethylene (TCNE) and tetracyanonaphthoquinodimethane (TNAP), etc. and a salt of a metal with relatively lower reduction potential such as copper, Silver, etc. deposited on an electrode.

As the method for forming such an organic semiconductor layer, the method of vacuum depositing the above electron accepting compound on an electrode of copper or silver may be employed.

The electric memory effect of such an organic semiconductor has been observed with one having a film thickness of some 10 μm or less, but one having a film thickness of 1 μm or less, further 30 Å to 500 Å is preferable from the standpoint of film formability and uniformity.

(3) Further, there can be employed a recording medium having a molecule having in combination a group having π electron level end a group having only σ electron level laminated on an electrode.

Examples of the structure of the dye having a suitable π electron system may include dyes having porphylline skeleton such as phthalocyanine, tetraphenylporphyline, etc., azulene type dyes having squarylium group and croconic methine group as the binding chain, dyes similar to cyanine type having 2 nitrogen containing heterocyclic rings such as quinoline, benzothiazole, benzoxazole, etc. bound through squarylium group and croconic methine group, or cyanine dyes, fused polycyclic aromatic such as anthraoene and pyrene, etc., and chain compounds comprising polymers of aromatic rings and heterocyclic rings, and polymers of diacetylene groups, further derivatives of tetracyanoquinodimethane or tetrathiafluvalene and homologues thereof, and charge transfer complexes thereof, and further metal complex compounds such as ferrocene, irisbipyridine ruthenium complexes, etc.

In addition to the low molecular weight materials as mentioned above, various high molecular weight materials also can be used.

For example, addition polymers such as polyacrylic acid derivatives, etc., condensed polymers such as polyimide, polyphenylene, polythiophene, etc., ring-opened polymers such as nylon, etc., or biological high molecular weight materials such as polypeptide, bacteriorhodopsin, etc. can be included.

Concerning formation of an organic recording medium, specifically application of the vapor deposition method, the cluster ion beam method, etc. is also possible, but among the known prior arts, the LB method is extremely preferable from the standpoint of controllability, easiness and reproducibility.

According to the LB method, a monolayer film of an organic compound having a hydrophobic site and hydrophilic site in one molecule or a built-up film thereof can be easily formed on a substrate, whereby an organic ultra-thin film which has a thickness of molecular order and is uniform and homogeneous over a large area can be supplied.

The LB method is a method of preparing a monolayer film or its built-up film by utilizing the fact that, in a molecule having a hydrophilic site and hydrophobic site in the molecule, when the balance between both (amphiphilic balance) is adequately maintained, a layer of single molecules is formed on water surface with the hydrophilic group directed downward.

As the group constituting the hydrophobic group, various hydrophobic groups such as saturated and unsaturated hydrocarbon groups, fused polycyclic aeromatic groups and chain polycyclic phenyl groups generally known widely in the art can be employed. These constitute individually or as a combination of a plurality thereof the hydrophobic moiety. On the other hand, most representative of the constituent of the hydrophilic portion are hydrophilic groups, for example, carboxyl group, ester group, acid amide group, imide group, hydroxyl group, further amino group (primary, secondary, tertiary and quaternary), etc. These constitute the hydrophilic portion of the above molecule each individually or as a combination of a plurality thereof.

A dye molecule which has these hydrophobic groups and hydrophilic groups with good balance, and also has a π-electron system having an adequate size can form a monomolecular film on water surface, and can be an extremely suitable material for the present invention.

Specific examples may include the molecules as set forth below.

[I] Croconicmethine dye

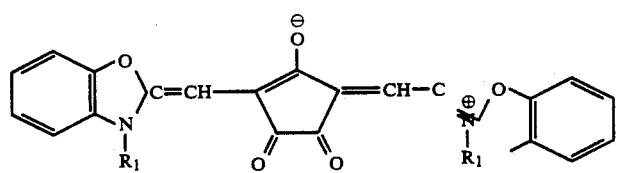

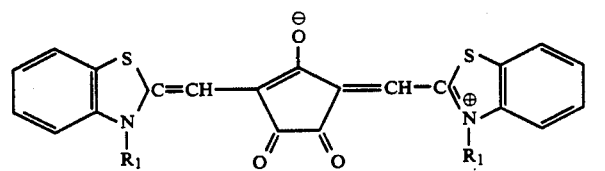

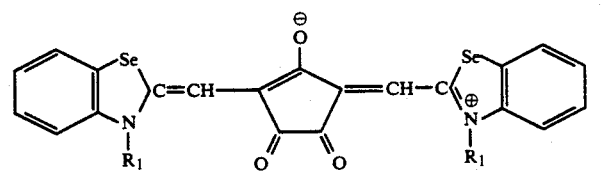

-continued
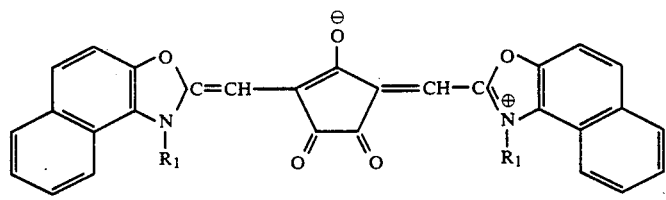
4)
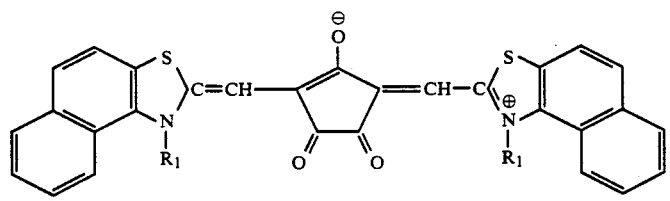
5)
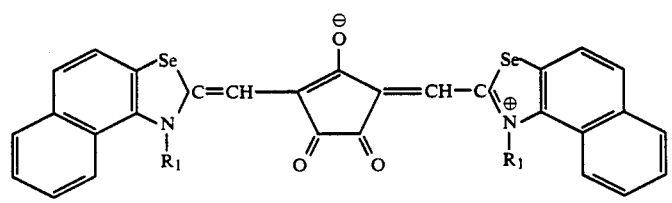
6)
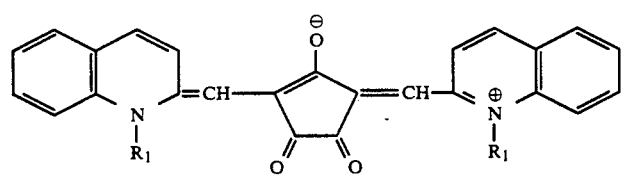
7)
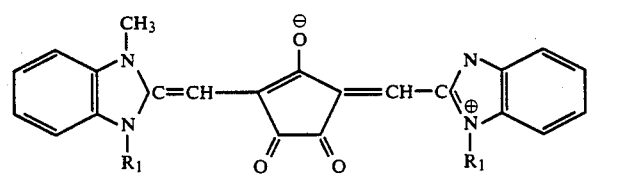
8)
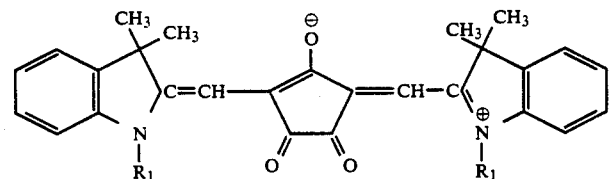
9)
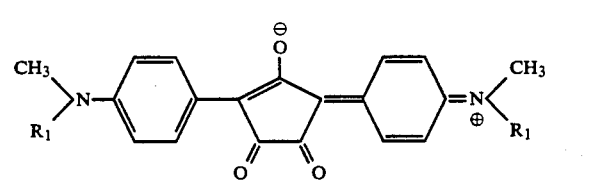
10)
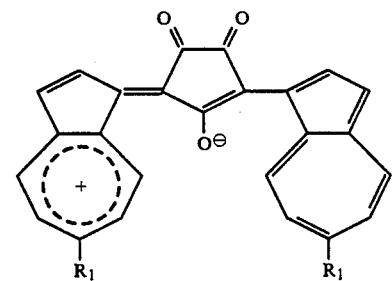
11)
Here, $R_1$ corresponds to the group having a σ-electron level as described above, and is a long chain alkyl group introduced for making formation of a monomolecular film on water surface easier, with its carbon atom number being suitably $5 \leq n \leq 30$.

The compounds as set forth above as specific examples are only basic structures, and various substituted derivatives of these are also suitable in the present invention as a matter of course.

[II] Squarylium dyes

Compounds mentioned in [I] with the croconic methine group replaced by squarylium group having the structure shown below:

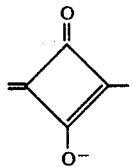

[III] Porphylline dye compounds

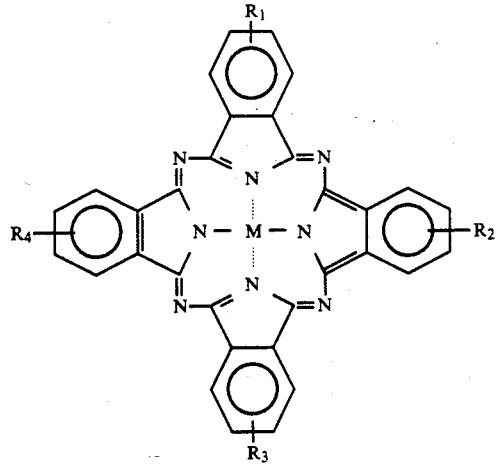

$R_1, R_2, R_3, R_4 = H, -O-\phi$, $-O-CH_2-C(CH_3)_3$, $-OC_5H_{11}, -C(CH_3)_3, -CH_2NHC_3H_7$ $M = H_2$, Cu, Ni, Al—Cl, SiCl$_2$ and rare earth metal ion.

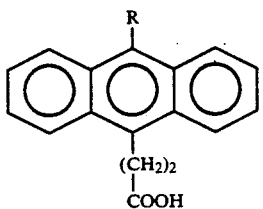

-continued $R = OCH(COOH)C_nH_{2n+1}$
$5 \leq n \leq 25$
$M = H_2$, Cu, Ni, Zn,
Al—Cl, SiCl$_2$ and rare earth metal ion.

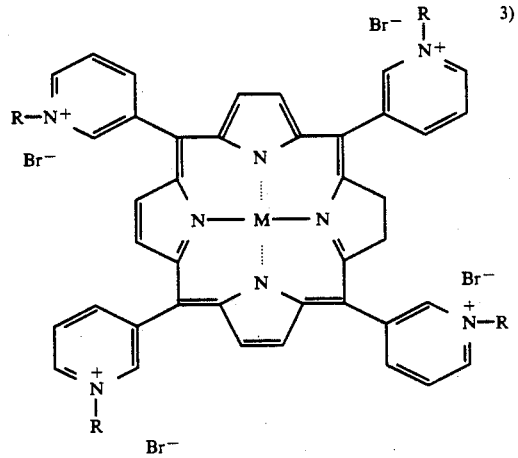

$R = C_nH_{2n+1}$
$5 \leq n \leq 25$
$M = H_2$, Cu, Ni, Zn,
Al—Cl, SiCl$_2$ and rare earth metal ion.

R is introduced for the purpose of making formation of a monomolecular film easier, and is not limited to the substituents mentioned here. $R_1$ to $R_4$ and R correspond to the groups having a σ-electron level as mentioned above.

[IV] Fused polycyclic aromatic compounds

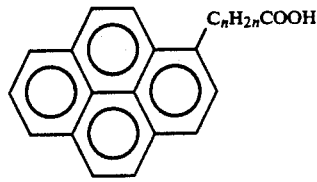

$R = C_4H_9 \sim C_{12}H_{25}$

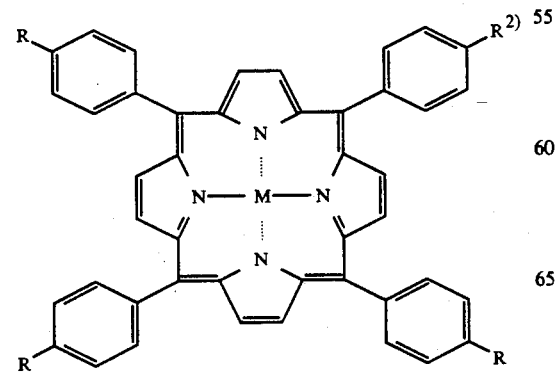

$C_nH_{2n}COOH$ $0 \leq n \leq 20$

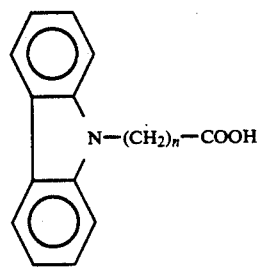

$N-(CH_2)_n-COOH$

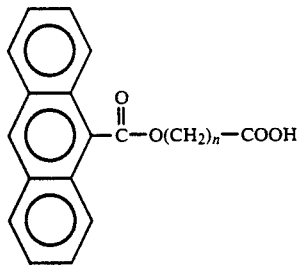

[V] Diacetylene compounds

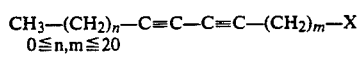

with proviso n+m>10

X is a hydrophilic group and generally —COOH may be employed, and also —OH, —CONH₂, etc. can be employed.

[VI] Others

1)
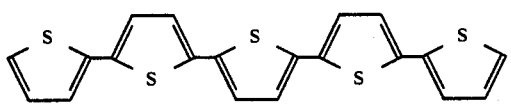

Quinquethienyl

2)
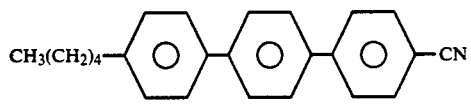

3)
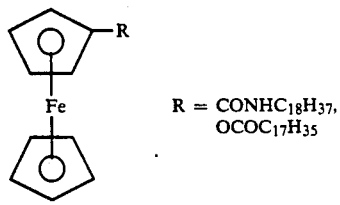

R = CONHC₁₈H₃₇, OCOC₁₇H₃₅

4)
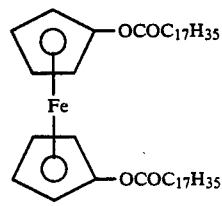

5)
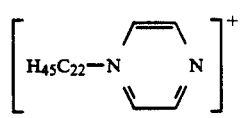

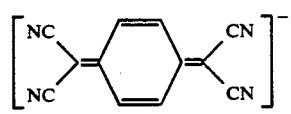

6)
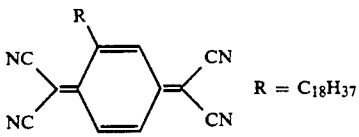

R = C₁₈H₃₇

<Organic polymeric materials>

[I] Addition polymers:

1) polyacrylic acid,

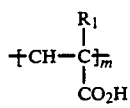

2) polyacrylate,

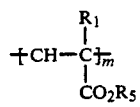

3) acrylic acid copolymer,

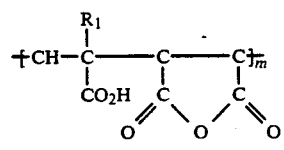

4) acrylate copolymer,

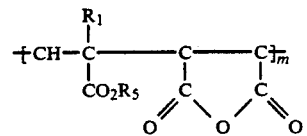

5) polyvinyl acetate,

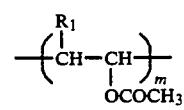

6) vinyl acetate copolymer

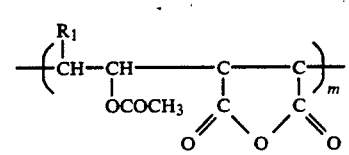

[II] Condensation polymers:

1) polyimid,

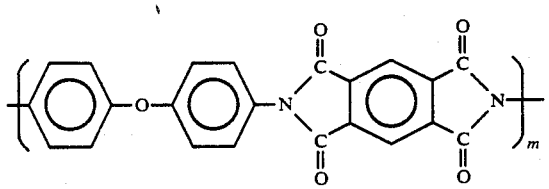

2) polyamide,

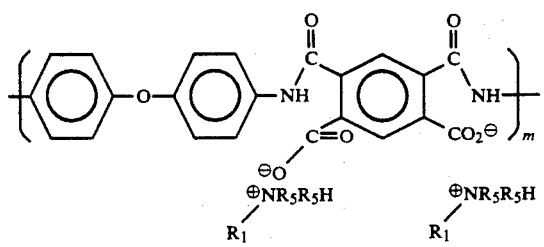

3) polycarbonate

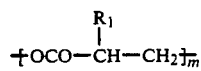

[III] Ring-opened polymers:
1) polyethylene oxide

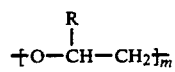

Here, $R_1$ is a long chain alkyl group introduced for the purpose of forming easily a monomolecular film on water surface, and its carbon number should be preferably $5 \leq n \leq 30$.

$R_5$ is a short chain alkyl group with a carbon number n being preferably $1 \leq n \leq 4$. The polymerization degree m may be preferably $100 \leq m \leq 5000$.

The compounds as mentioned above as specific examples are only basic structures, and various substituted derivatives of these compounds are also suitable in the present invention as a matter of course.

Other than those as mentioned above, dye materials which are suited for the LB method are also suitable for the present invention as a matter of course. For example, biological materials of which studies are becoming active in recent years (e.g. bacteriorhodopsin or chitochrome c) or synthetic peptides (e.g. PBLG, etc.) are applicable.

The electric memory effect of these compounds having $\pi$-electron level has been observed also with one having a film thickness of some 10 nm or less, but from the standpoint of film formability and uniformity, a film thickness of 2000 Å or less is preferable. Further, in the present invention, for reading the electron state of the substrate through the recording layer, the recording layer should be desirably formed extremely thin, optimally with the thickness of 10 to 200 Å.

The substrate for supporting the material having the electric memory effect as described above in the items (1) to (3) is required to have the character as the electrode, but all of electroconductive materials having electroconductivity of $10^{-6}$ ($\Omega$ cm$^{-1}$) or more can be employed. That is, metal plates of Au, Pt, Pd, Ag, Al, In, Sn, Pb, W, etc. or alloys of these, or those having these metals or alloys deposited on glass, ceramics, plastic substrates also can be used. Further, a large number of materials such as Si single crystal or graphite may be employed.

However, since these electrode substrates also have the role as the coordinate axis as mentioned above, they are required to have a regular atomic arrangement as a matter of course.

Hence, they are required to have a single crystal region corresponding to at least the size of the desired recording region.

The tip end of the probe electrode to be used in the present invention is required to be pointed as far as possible in order to enhance the recording/reproduction/erasing resolving ability. As its material, for example, Pt, Pt-Rh, Pt-Ir, W, Au, Ag, etc. can be included. In the present invention, a tungsten with a thickness of 1 mm $\phi$ is controlled in its tip end shape by use of the electrolytic polishing method before use as the probe electrode, but the shape and the treatment method of the probe are not limited to these.

Further, the number of the probe electrode is not required to be limited to one, but a plurality of probe electrodes also may be employed, such as separately used for positional detection and for recording and reproduction. Above all, by use of separate probe electrodes for positional detection and for recording and reproduction, higher speed of processing and reduction of error rate during reproduction can be preferably effected.

Detection of change in distance between the recording medium and the probe electrode.

In the present invention, recording/reproduction/erasing of information is performed continuously by scanning the probe for recording and reproduction on the recording medium surface while maintaining the distance between the probe electrode and the recording medium surface constant but even when the recording medium may be changed by such causes as heat drift or vibration, it is required to contrive maintenance of the above-mentioned distance at a constant value. Such a requirement can be solved by utilizing the probe electrode and measuring the tunnel current $J_T$ flowing between said probe electrode and the electrode substrate, end if there is any change in $J_T$ found in this measurement, correcting the position (height direction) of the probe electrode for recording and reproduction based on such change amount. In this case, by time division of the bias voltage to be applied between the probe electrode for recording and reproduction and the electrode substrate, one may be employed for recording/reproduction/erasing and the other for positional detection of the electrode substrate in the thickness direction. However, in addition to a complicated driving method, the electroconductivity or the shape of the recording site in the recording layer will change as accompanied with recording of information. Therefore, particularly during reproduction of recorded information, there may be the problem that it is difficult to distinguish whether the change in tunnel current detected is due to the positional change of the recording medium or due to the recorded information. Accordingly, it is desirable that the probe electrode for recording and reproduction and the probe electrode for detection of the change amount of the distance from the recording medium (hereinafter this is called probe electrode for Z direction change amount detection) should be different. Such probe electrode for Z direction change amount detection and the probe electrode for atomic arrangement detection of an electrode substrate may be either the same or different. If there occurs a change with respect to the interplanar direction of the recording medium, not only its change amount can be detected by use of the probe electrode for atomic arrangement detection as a matter of course, but also the scanning direction of the probe electrode for recording and reproduction can be corrected based on this. The probe electrode for Z direction change amount detection is not required to be limited to one, but a plurality of probe electrodes also may be also employed.

<Constitution of information processing device>

Figure 1:
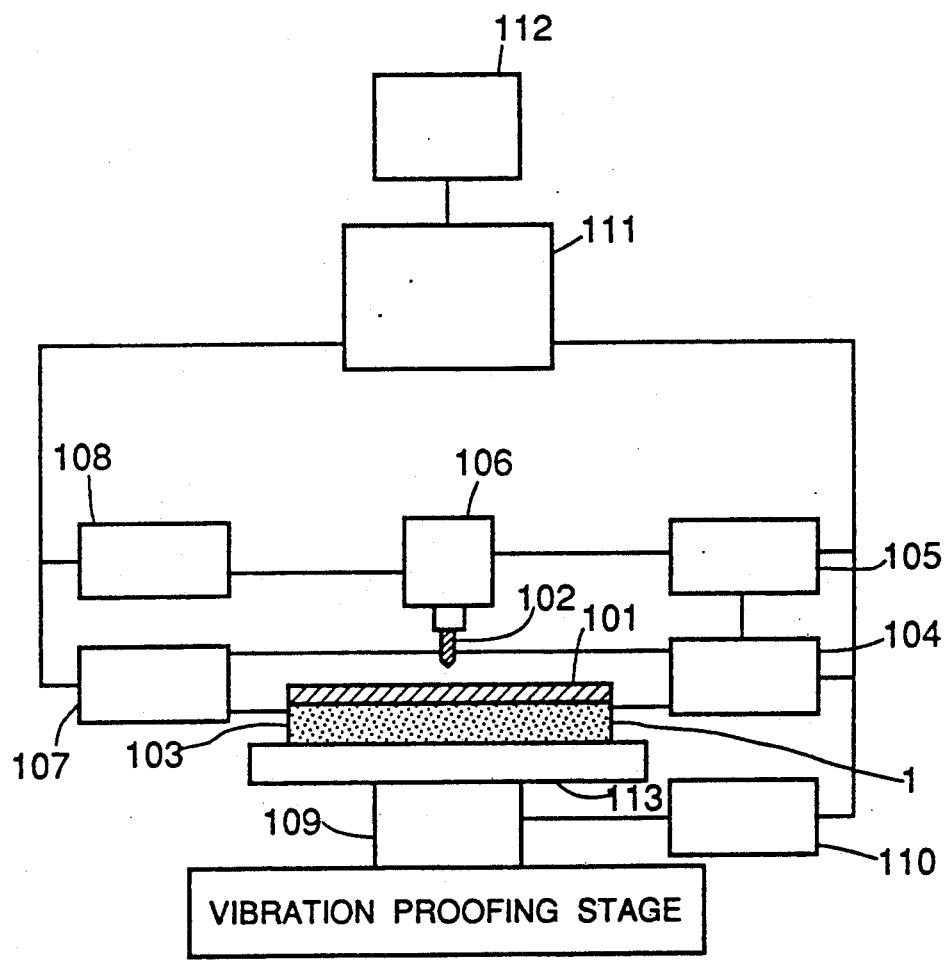
FIG. 1 is an illustration showing diagramatically a recording-reproduction device to be used in the method of the present invention.

FIG. 1 is a block constitution diagram showing an information processing device to be used in the first embodiment of the present invention. In FIG. 1, 104 is a probe current amplifier, 105 a servo circuit for controlling the fine adjustment mechanism 106 by use of e piezoelectric element so that the probe current may become constant. Reference numeral 107 is a variable voltage power source for applying a pulse voltage for recording/erasing and a voltage for reading the lattice period of the substrate 103 and for information reading (reproduction) of the recording layer 101 between the probe electrode 102 and the substrate (electrode) 103.

Because the probe current abruptly changes when applying a pulse voltage, the servo circuit 105 controls the HOLD circuit to be ON so that the output voltage may become constant during that period.

Reference numeral 108 is an X, Y scanning driving circuit for movement control of the probe electrode 102 in the X, Y directions. Reference numerals 109 and 110 are provided for controlling coarsely the distance between the probe electrode 102 and the recording medium 1 so that a probe current of about $10^{-9}$ A may be taking large relative displacements in the X, Y directions between the probe electrode and the substrate (outside fine adjustment control mechanism).

FIG. 8 is a block diagram showing an information processing device in the case of having two probe electrodes for positional detection and for recording and reproduction in the present invention. In FIG. 8, 802 and 803 are respectively probe electrodes to be used for recording and reproduction end for positional detection, and the distance between the two probe electrodes is capable of fine adjustment by the probe electrode interval fine adjustment mechanism 811 using a piezoelectric element, but is generally maintained at a constant interval. Reference numeral 806 is a bias voltage source and probe current amplifier, and 808 a servo circuit for controlling the Z direction fine adjustment mechanism 807 by use of a piezoelectric element. Reference numeral 812 is a power source for applying a pulse voltage for recording/erasing between the probe electrode 802 for recording and reproduction and the electrode substrate 804.

Because the probe current abruptly changes when applying a pulse voltage, the servo circuit 808 controls the HOLD circuit to be ON so that the output voltage may be constant during that period.

Reference numeral 810 is an XY scanning driving circuit for movement control of a pair of probe electrodes 802 and 803 in the XY direction. Reference numeral 813 and 814 are used for previously controlling coarsely the distance between the probe electrodes 802, 803 and the recording medium 1 so that a probe current of about $10^{-9}$ A may be obtained or for taking large XY direction relative displacement between the probe electrodes and the substrate (outside the range of fine adjustment control mechanism).

All of these respective instruments are under central control of a microcomputer 111 or 815. Reference numerals 112 and 816 represent display instruments.

The mechanical performances in movement control by use of piezoelectric elements are shown below.

Z direction fine adjustment control range: 0.1 nm–1 μm

Z direction coarse adjustment control range: 10 nm–10 mm

XY direction scanning range: 0.1 nm–1 μm

XY direction coarse movement control range: 10 nm 10 mm

Measurement, control tolerance error: <0.1 nm (during fine adjustment control)

Measurement, control tolerance error: <1 nm (during coarse adjustment control)

In the following, the information processing system of the present invention is described in detail by referring to Examples.

EXAMPLE 1

As the probe electrode 102 by use of the recording-/reproduction device shown in FIG. 1, a probe electrode made of tungsten was employed. The probe electrode 102 is to control the distance (Z) from the surface of the recording medium 1, and its distance (Z) is subjected to fine adjustment control by a piezoelectric element so that the current may be maintained constant. Further, the fine adjustment control mechanism is designed so that fine adjustment control may be possible also in the interplanar (X, Y) direction while maintaining the distance (Z) constant. However, these are known techniques.

The probe electrode 102 is used for performing relative direction positional detection within the recording medium plane and recording, reproduction and erasing. The recording medium 1 is placed on a high precision X, Y stage 113 and can be moved to any desired position (X, Y coarse adjustment mechanism). In this connection, the X, Y directions of the coarse adjustment mechanism and the X, Y directions of the fine adjustment mechanism are coincident within the error range caused by the difference in precision of the respective movement control mechanisms.

Next, details of the recording medium used in this Example are described. The constitutional illustration is shown in FIGS. 2A and 2B. FIG. 2A is a plan view of the recording medium used in the present invention, and FIG. 2B is a sectional view taken along its A—A'. A p type Si wafer (B doped, 0.3 mm thickness) with the (111) face exposed with ½ inch diameter was employed as the substrate 103. Said substrate is cut at the B—B' point for the purpose of making the directionality then placed on the X, Y stage 113 of the recording and reproduction device substantially constant. The B—B' point is substantially in parallel to the [211] direction of Si crystal.

Next, etching was effected at the position 1 mm toward the substrate center from the center point of B—B' to 1 gm square and 0.2 gm depth to prepare the standard original point (coarse) 201. The method for preparing such standard original point (coarse) 201 is shown below.

First, a polymethyl methacrylate which is an electron beam resist (PMMA, trade name OEBR-1000, Tokyo Oka Kogyo K.K.) is coated to a thickness of 1 μm on an Si substrate, then an electron beam was drawn to a size of 1 μm square at an acceleration voltage of 20 KeV, a beam diameter of 0.1 μmϕ. Then, the electron beam irradiated portion was dissolved by a developer sputtering etching by use of a gas mixture of $CF_4$ and $H_2$ at a pressure of 3 Pa, a discharging power of 100 W for 20 minutes. The etching depth at that time was 0.2 μm. Finally, PMMA was dissolved by use of methyl ethyl ketone.

Next, on such a Si substrate was laminated an LB film (2 layers) of squarylium-bis-6-octylazulene (hereinafter abbreviated as SOAZ) to provide a recording layer 101. In the following, the method for forming the recording layer is described. First, a benzene solution containing SOAZ dissolved at a concentration of 0.2 mg/ml is spread on aqueous phase of 20° C. to form a monolayer film on water surface. After waiting for evaporation of the solvent, the surface pressure of such monolayer film is enhanced to 20 mN/m, and further the above substrate is repeatedly dipped and withdrawn gently at a speed of 3 mm/min. in the direction across the water surface while maintaining the pressure constant to form a two-layer built-up film of SOAZ monolayer film on the substrate 103.

By use of the recording medium 1 prepared as described above, the experiments of recording and reproduction were performed.

In the following, the details of such experiments are described.

The recording medium 1 having the recording layer 101 having one layer of SOAZ built up was placed on the X, Y stage 113 with the cut B—B' direction being matched to a predetermined direction.

Next, the probe electrode 102 gas moved to the position inside the substrate about 1 mm from B—B' and, on application of a probe voltage of 0.6 V between the probe electrode and the Si substrate 103, the X direction of the probe fine adjustment mechanisms 106, 108 was matched tentatively in the direction substantially in parallel to B—B', followed by scanning over a length of 1 μm.

Next, scanning was also performed in the Y direction (perpendicular to the X direction) over 1 μm. At this time, the ways of taking X, Y coordinate axes were variously changed to repeat measurements of the surface state, and controlled so that the arrangement pitches of Si atoms obtained take the values most approximate to 6.65 Å and 3.84 Å, respectively. By such control, the X axis of the fine adjustment mechanism is coincident with the $[\overline{2}11]$ direction of the Si substrate and the Y axis with the $[01\overline{1}]$ direction.

Figure 3:
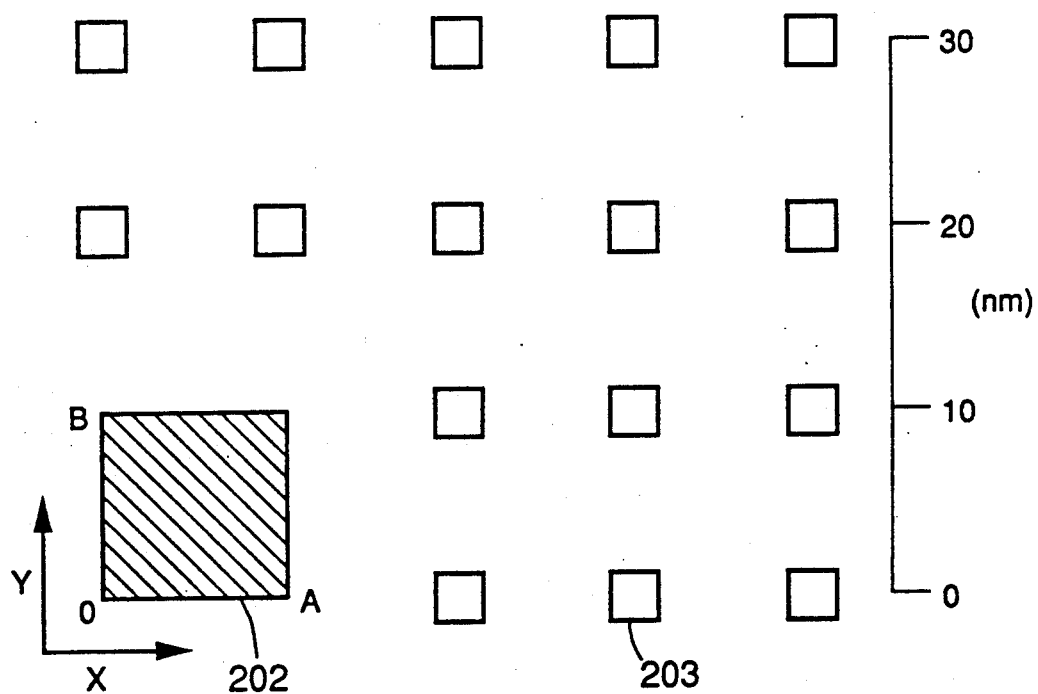
FIG. 3 is a schematic view showing the recording position on the surface of the recording material of the present invention.
Figure 4A:
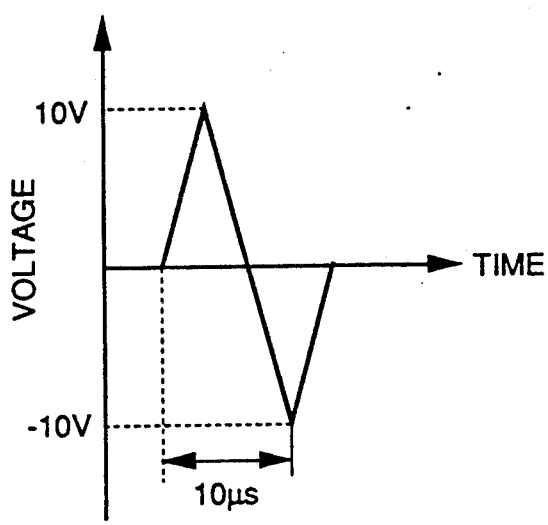
FIG. 4A is an illustration showing the waveform of the writing pulse voltage onto the recording layer in the present invention, and FIG. 4B an illustration showing the waveform of the pulse voltage for erasing the information written into the recording layer.

At this time, concurrently, the X, Y directions of the coarse adjustment mechanism were controlled so as to be coincident with the X, Y directions of the fine adjustment mechanism within the control error of the coarse adjustment mechanism. Next, concerning X' Y directions, the probe electrode was scanned by use of the coarse adjustment mechanism to detect the standard original point (coarse) 201. A& the position toward the substrate center portion 2 mm along the Y axis direction from such a Standard original point (coarse), a standard original point (fine) 202 was provided. Such a standard original point (fine) is formed according to the operations as described below by utilizing the electric memory effect of the recording layer 101. First, by applying a probe voltage of 1.0 V between the probe electrode 102 and the Si substrate (electrode) 103, the distance (Z) between the probe electrode 102 and the surface of the recording layer 101 was controlled by use of the fine adjustment mechanism 106 so that the probe current Ip became $10^{-9}$ A. In the following operations up to confirmation of ON state, the movement Control in the Z direction of the probe electrode was stopped. Next, with the probe electrode 102 on the + side and the Si substrate 103 on the—side, a pulse voltage shown in FIG. 4A in which the electric memory material (SOAZ-LB film 2 layers) changes to the low resistance state (ON state) was applied. Then, by applying a probe voltage of 0.1 V between the probe electrode 102 and the Si substrate 103, the probe current Ip was measured, whereby a current of about 2 mA flowed to confirm the ON state. Further, the region of the ON state is shown in FIG. 3. A standard original point (fine) 202 was formed in the form of 10 nm square with the side $\overline{OA}$ coincident with the atomic row in the $[\overline{2}11]$ direction and the side $\overline{OB}$ coincident with the atomic row in the $[01\overline{1}]$ direction. By taking such form, reproduction confused with the recording information to be written later as shown in FIG. 3 was avoided. The shape of such a standard original point (fine) 202 is not limited to the shape of this Example et all.

Next, with such a standard original point (fine) as the original point on the X, Y coordinate of the probe electrode positional control system, the probe electrode 102 was subjected to fine adjustment scanning to perform recording of information at a pitch of 0.01 μm. FIG. 3 shows a schematic view of &he recording position per one bit on the recording surface 101. The recoding position 203 was detected by detecting the side $\overline{OA}$ or the side $\overline{OB}$ of the standard original point (fine), then applying a probe voltage of 100 mV between the probe electrode 102 and the Si substrate 103 and reading the movement amount in the Z direction of the probe electrode 102 from the servo circuit when drawing the X-Y plane while applying a feed back at the position in the Z direction of the probe electrode 102 so as to maintain the probe current Ipat $10^{-9}$ A, or maintaining the probe voltage at 100 mV and reading the change in tunnel current when drawing the X-Y plane with detachment of the above-mentioned feed back system to thereby read the lattice period of the Si substrate through the recording layer, and measurement was performed severely by utilizing the period in the X direction of 6.65 Å and the period in the Y direction of 3.84 Å. Such recording was performed by making the ON state and the OFF state (high resistance state before recording) on the electric memory material (SOAZ-LB film one layer) according to the same method as in formation of the standard original point (fine).

The recording medium 1 formed according to the steps as described above was taken off once from the recording and reproduction device, and again placed on the X, Y stage 113 and subjected to the reproduction experiment, whereby bit error rate was found to be $1 \times 10^{-6}$.

Figure 4B:
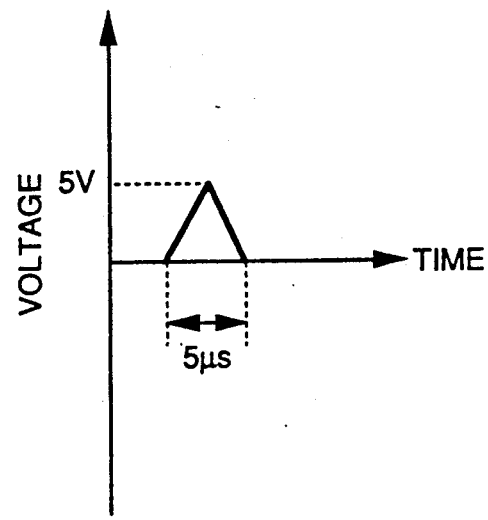

Also, according to the same method as during recording, a pulse voltage shown in FIG. 4B at which the electric memory material changes from the ON state to the OFF state was applied relative to the individual recording points while drawing the X-Y plane, between the probe electrode 102 and the Si substrate 103. As the result, all the recorded states were confirmed to be erased to be transitioned to the OFF state.

COMPARATIVE EXAMPLE 1

In the reproduction experiment in Example 1, when setting of the X Y coordinate system of the probe electrode scanning mechanism by use of the atomic scale and setting of the positional coordinate original point based on the positional detection of standard original points (coarse) and (fine) were omitted, it was difficult to find easily the recording writing region on the recording medium 1.

EXAMPLE 2

Recording and reproduction experiments were performed in the same manner as in Example 1 except for changing the substrate 103 to a Ga-As wafer, and the recording layer 101 to a one layer LB film of t-butyl substituted derivative of phthalocyanine silicon chloride ($PcSiCl_2$). In the following, differences from Example 1 are described. The constitution of the recording medium 1 is according to FIG. 2. Here, as the substrate, a p type Ga-As wafer of a diameter of ½ inch with the (110) face exposed (Zn doped, 0.3 mm thickness) was employed. The cutting B—B' direction of the substrate is substantially parallel to the [001] direction of the Ga-As crystal.

Next, a standard original point (coarse) was formed by effecting etching at the position 1 mm toward the substrate center from the middle point of B—B' to 1 μm square and a depth of 0.2 μm. The method for preparing such standard original point (coarse) 201 is shown below.

Figure 2:
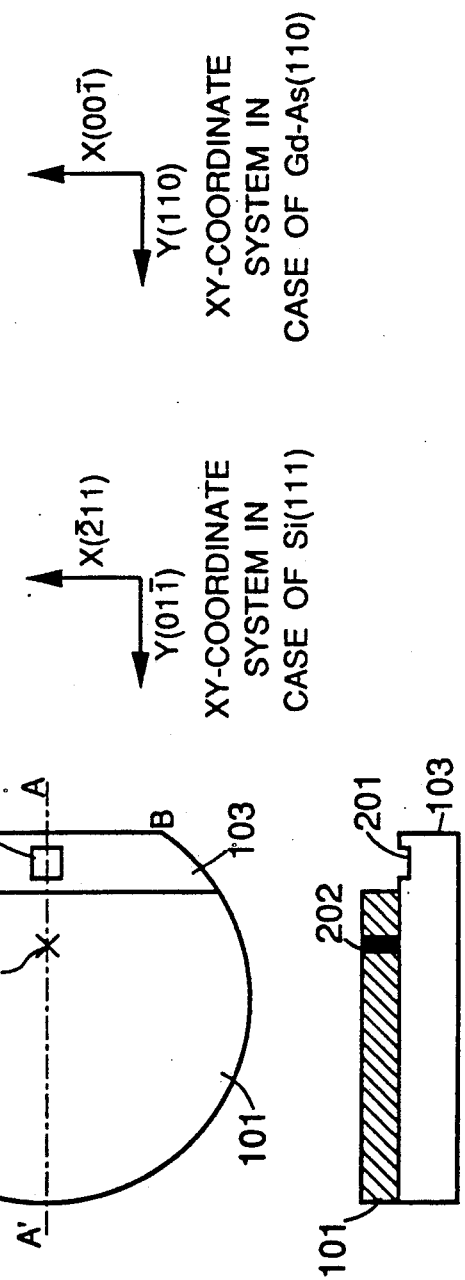
FIG. 2A is a plan view of the recording medium used in the present invention, and FIG. 2B its seotional view taken along A—A'.

First, after a UV-ray resist (trade name AZ 1350) was coated to a thickness of 1 μm on the Ga-As substrate and prebaked, treatments of UV-ray exposure, developing and post-bake were applied by use of a mask corresponding to FIG. 2 to form a mask pattern on the Ga-As substrate. Next, sputtering etching was performed by use of $BCl_3$ gas under a gas pressure of 1 Pa and a discharging voltage of 100 W for 3 minutes to effect etching to a depth of 0.2 μm. The mask of AZ1350 was removed by acetone washing.

On such substrate was built up 2 layers of LB film of t-butyl substituted derivative of phthalocyanine silicon chloride ($PcSiCl_2$) to provide a recording layer 101. In the following, preparation conditions of the recording layer are shown.

Solvent: $CH_3CCl_3$
Solution concentration: 1 mg/ml
Aqueous phase: pH 8.2 (pure water adjusted with NaOH)
Surface pressure: 25 mN/m
Vertical speed of substrate: 5 mm/min. (built-up is Z type)

By use of the recording medium 1 prepared as described above, the recording and reproduction experiments were conducted, whereby the bit error of reproduction was found to be $1 \times 10^{-6}$.

However, concerning setting of the X, Y coordinate axes by use of atomic scale, the X-axis was controlled so as to be coincident with the [001] direction of the Ga-As crystal and the Y-axis with the [110] direction. The Ga-Ga interatomic pitch in this case was found to be 5.65 Å with respect to the [001] direction and 4.00 Å with respect to the [110] direction.

EXAMPLE 3

Recording and reproduction experiments were performed in substantially the same manner except for changing the recording layer 101 in Example 1 to one layer LB film of octadecyltetracyanoquinodimethane/copper complex (ODTCNQ/Cu). In the following, differences from Example 1 are described. The constitution of the recording medium 1 is according to FIG. 2. Here, the film formation method of ODTCNQ/Cu is to be described. A solution with a concentration of ODTCNQ/Cu of $4 \times 10^{-6}$ M was prepared by use of acetonitrile (ACN) as the solvent. The solution was spread on an aqueous phase of pure water of 20° C., the surface pressure was enhanced to 20 mN/m, and a monolayer film was formed on the water surface. While maintaining the surface pressure constant, the Si substrate previously dipped in the aqueous phase was withdrawn in the direction crossing the water surface gently at a speed of 5 mm/min. to form an ODTCNQ/Cu monolayer film on the Si substrate.

By use of the recording medium 1 prepared as described above, recording and reproduction experiments were conducted, whereby the bit error during reproduction was found to be $1 \times 10^{-6}$.

EXAMPLE 4

Figures 5A, 5B:
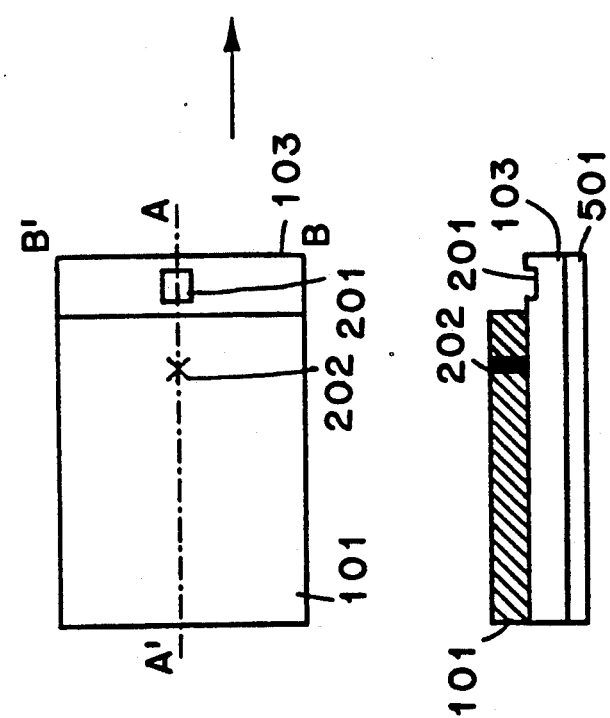
FIG. 5A is a plan view of another recording medium used in the present invention, and FIG. 5B its sectional view taken along A—A'.

Recording and reproduction experiments were performed in substantially the same manner as in Example 1 except for changing the substrate of Example 1 to an epitaxial Au laminated on mica. In the following, the differences from Example 1 are described. The constitution of the recording medium 1 is shown in FIGS. 5A and 5B. Here, the substrate was formed by placing mica 501 into a vacuum deposition device after cleavage in air, and growing epitaxially on such mica 501 a thin film of a single crystal of Au to a film thickness of 2500 Å at a substrate temperature of 500° C. and a vapor deposition speed of 20 Å/min.

Next, at the position of 1 mm toward the substrate center from the middle point of B—B', etching was effected to 1 μm square and a depth of 0.2 μm to prepare a standard original point (coarse) 201. The method for preparation of such a standard original point (coarse) 201 is shown below.

First, after a resist (trade name AZ 1350) was coated to a thickness of 1 μm on Au and prebaked, treatments of UV-ray, developing and post-bake were applied by use of a mask corresponding to FIG. 4 to prepare a mask pattern on Au. Next, etching was effected by ion milling to a depth of 0.2 μm. The conditions at this time was an ion current density of 0.5 $mA/cm^2$, a table angle of 60° and an etching rate of 500 Å/min. The resist of the mask was removed by acetone washing.

By use of the recording medium 1 having a recording layer of one layer of SOAZ formed on such a substrate similarly as in Example 1, the recording and reproduction experiments were conducted, whereby the bit error rate during reproduction was found to be $1 \times 10^{-6}$.

However, concerning setting of X, Y coordinate axes by use of atomic scale, the X-axis was adjusted to be coincident with the (1, 0, $\bar{1}$) direction of the Au crystal and the Y-axis with the ($\bar{1}$, 2, $\bar{1}$) direction. In this case, the Au-Au interatomic pitches were 2.88 Å with respect to the X direction and 5.00 Å with respect to the Y direction.

EXAMPLE 5

An information processing device shown in FIG. 8 was employed. As the probe electrodes 802, 803, probe electrodes made of tungsten were employed. The probe electrodes 802, 803 are to control the distance (Z) from the surface of the recording medium 1, and the distance (Z) is each independently controlled in fine adjustment by a piezoelectric element so that the current may be maintained constant. Further, the fine adjustment control mechanism is designed so that fine adjustment control can be effected also in the interplanar (X, Y) direction while maintaining the distance (Z) constant.

Of the two probe electrodes, the probe electrode 803 is used for detection of the atomic arrangement as the positional coordinate of the electrode substrate 804. On the other hand, the probe electrode 802 for recording and reproduction is held at a constant position with respect to the probe electrode 803 for positional detection in the X-Y direction (the interval can be controlled by use of the probe electrode interval fine adjustment mechanism 811), and used for recording, reproduction and erasing onto the recording layer 801.

These two probe electrodes are basically designed so as to be finely controlled toward the interplanar (X, Y) direction mutually associated with each other, but each independently finely controlled toward the Z direction. On the other hand, the recording medium 1 is placed on the X-Y stage 817 and can be moved to any desired position (X-Y coarse adjustment mechanism). The X-Y direction of the coarse adjustment mechanism and the X-Y direction of the fine adjustment mechanism can be made coincident within the ranges caused by the difference in precision of the respective movement control mechanisms.

Next, the details of the recording medium used in this Example are described. By use of mica as the substrate 805, and after cleavage of this in air, gold is vapor deposited to 2500 Å thickness on such a cleaved surface to form an electrode substrate 104 comprising a single crystal thin film of gold. The vapor deposition conditions were a vacuum degree of $1 \times 10^{-6}$ Torr, a substrate temperature of 500° C. and a vapor deposition speed of 20 Å/min.

Next, on such electrode substrate were laminated 2 to 8 layers of a polyimide LB film to form a recording layer 801.

In the following, the method for preparing the polyimide LB film is to be described.

A polyamic acid represented by the formula (2) was dissolved in N,N-dimethylacetamide solvent (concentration calculated on monomer $1 \times 10^{-M}$), and then mixed with a $1 \times 10^{-3}$ M solution of N,N-dimethyloctadecylamine separately prepared with the same solvent at 1:2 (V/V) to prepare a polyamic acid octadecylamine salt solution represented by the formula (3).

Such a solution was spread on an aqueous phase comprising pure water of a water temperature of 20° C. to form m monolayer film on the water surface. After removal of the solvent, the surface pressure was enhanced to 25 mN/m. While maintaining the surface pressure constant, the substrate equipped with opposed electrodes as described above was dipped gently at a speed of 5 mm/min. in the direction transversing the water face, and subsequently drawn up gently at 5 mm/min. to prepare a Y-type monolayer built-up film of 2 layers. Further, by repeating such operations, monolayer built-up films of polyamic acid octadecylamine salt of 4, 6, 8 layers were also formed.

Next, such a substrate was subjected to heat treatment at 300° C. for 10 minutes to imidate the polyamic acid octadecylamine salt (formula (4)) to obtain polyimide LB film of 2, 4, 6 or 8 layers.

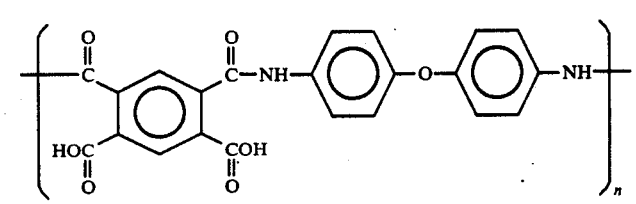
(2)

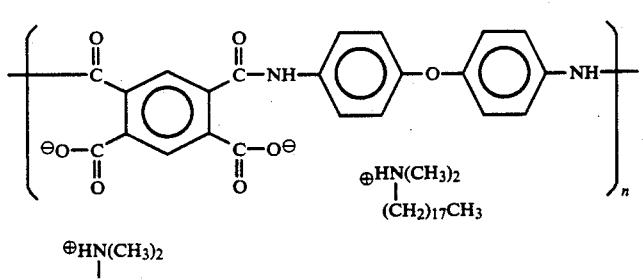
(3)

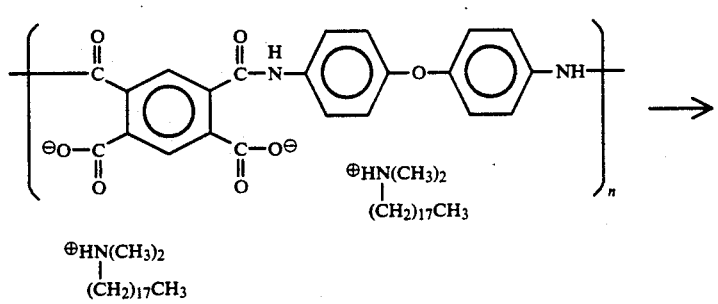
(4)

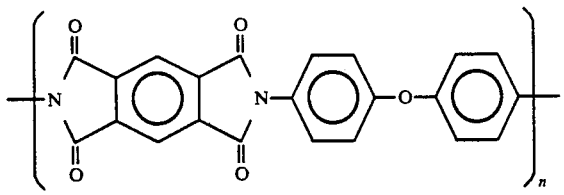

Recording and reproduction experiments by use of the recording medium 1 as described above were conducted as described in detail below.

The recording medium 1 having the recording layer 801 with two layers of polyimide laminated was placed on the XY stage 817. Next, the probe electrode for positional detection 803 was moved, and a probe voltage of 0.1 V was applied between such a probe electrode for positional detection 803 and the gold electrode substrate 804. Then, the distance between the probe electrode 803 and the surface of the recording medium 1 was approximated by use of the Z-axis direction fine adjustment control mechanism 107 and the servo circuit 808 until the tunnel current became about 1 nA. Next, by use of the XY-direction fine adjustment control mechanism 809 and XY-direction scanning driving circuit, the probe electrode for positional detection 803 was scanned over a range of 60 Å square to detect the electrode substrate, namely the atomic arrangement of gold Concerning the crystal structure of gold obtained, its (1, 0, $\bar{1}$) direction was adjusted to the X-direction of the probe electrode scanning system, and ($\bar{1}$, 2, $\bar{1}$) direction to the Y-direction of the probe electrode scanning system. In this case, the Au-Au interatomic pitches were 2.88 Å with respect to the X-direction and 5.00 Å with respect to the Y-direction. At the same time, the XY-direction of the coarse adjustment mechanism was adjusted so as to be coincident with the XY direction of the adjusted fine adjustment mechanism within the control error of the coarse adjustment mechanism.

Next, between the probe electrode for recording and reproduction 802 and the electrode substrate 804, a probe voltage of 0.5 V was applied, and the distance between the probe electrode 802 and the surface of the recording medium 1 was adjusted by use of the Z-axis fine adjustment control mechanism 807 and the servo circuit 808 so that the tunnel current became 1 nA. Next, by use of the probe electrode interval fine adjustment control mechanism 811, the distance between the probe electrode for recording and reproduction 802 and the probe electrode 803 for positional detection was adjusted to x=2 mm, Y=0 mm.

Figure 9:
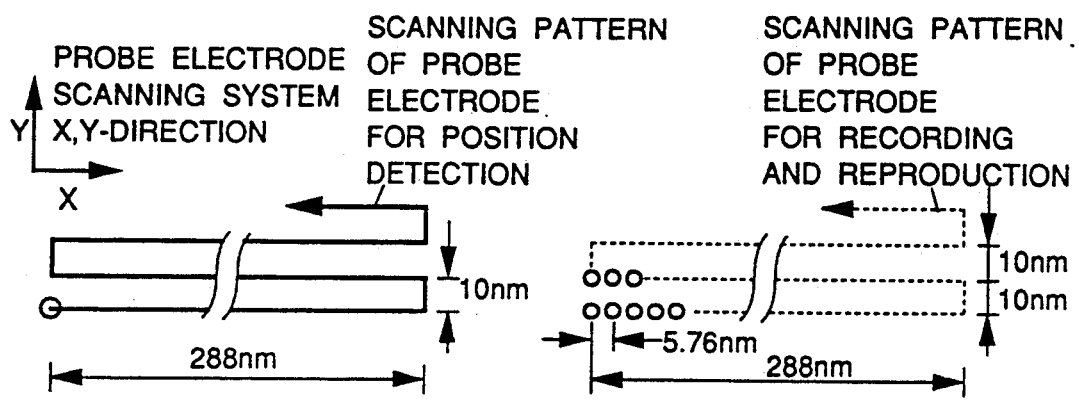
FIG. 9 is a schematic view showing a mode of the positional relationship between the coordinate axis and the recording position on the surface of the recording medium of the present invention.
Figure 10:
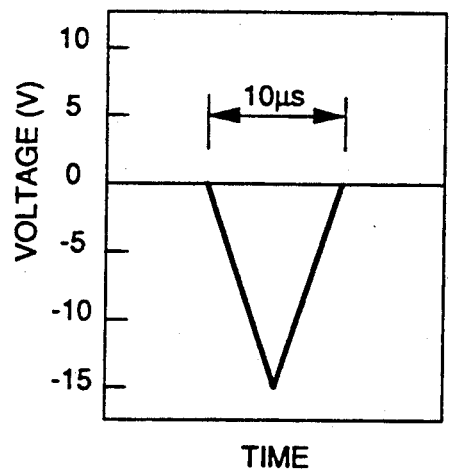
FIG. 10 is an illustration showing the waveform of the electric pulse necessary for forming the ON state in the recording medium which is under the OFF state of the present invention.

Next, the probe electrode for positional detection 803 was scanned following the scanning pattern shown in FIG. 9. At this time, with the distance between the probe electrode 803 and the recording medium 1 being fixed under the condition of a probe voltage=0.1 V previously described and under the conditions initially determined, while monitoring the change in tunnel current intensity caused by the atomic arrangement of gold, the scanning direction was constantly corrected so as to be coincident with the (1, 0, $\bar{1}$) direction (X-axis) and the ($\bar{1}$, 2, $\bar{1}$) direction (Y-axis) of the gold crystal. Following the probe electrode scanning pattern for positional detection as described above, the probe electrode 802 for recording and reproduction will also move on an equal scanning pattern as associated therewith, and desired recording was performed on the recording layer 801. Recording of the present invention is formed by utilizing the electric memory effect of the recording layer 801. That is, by applying a triangular pulse voltage having a waveform shown in FIG. 10 following information by use of the pulse voltage source 812, a low resistance state (ON state) was created on the recording layer 801 comprising the polyimide 2-layer LB film. At this time, the probe electrode for recording and reproduction 802 was made the + side and the gold electrode substrate 804 the − side. The recording pit was set at 5.76 nm pitch. After recording, reproduction of the recorded information was performed again following the pattern in FIG. 9. In this case, by applying a voltage for reading of 0.5 V which is a voltage not exceeding the threshold value voltage capable of giving rise to the electric memory or erasing between the probe electrode for recording and reproduction 802 and the gold electrode substrate 804, the tunnel current was measured and reproduction of the recorded information was performed. In the reproduction experiment as described above, the bit error rate when the data transfer speed was made 1 MHz was found to be $8 \times 10^{-6}$.

Figure 11:
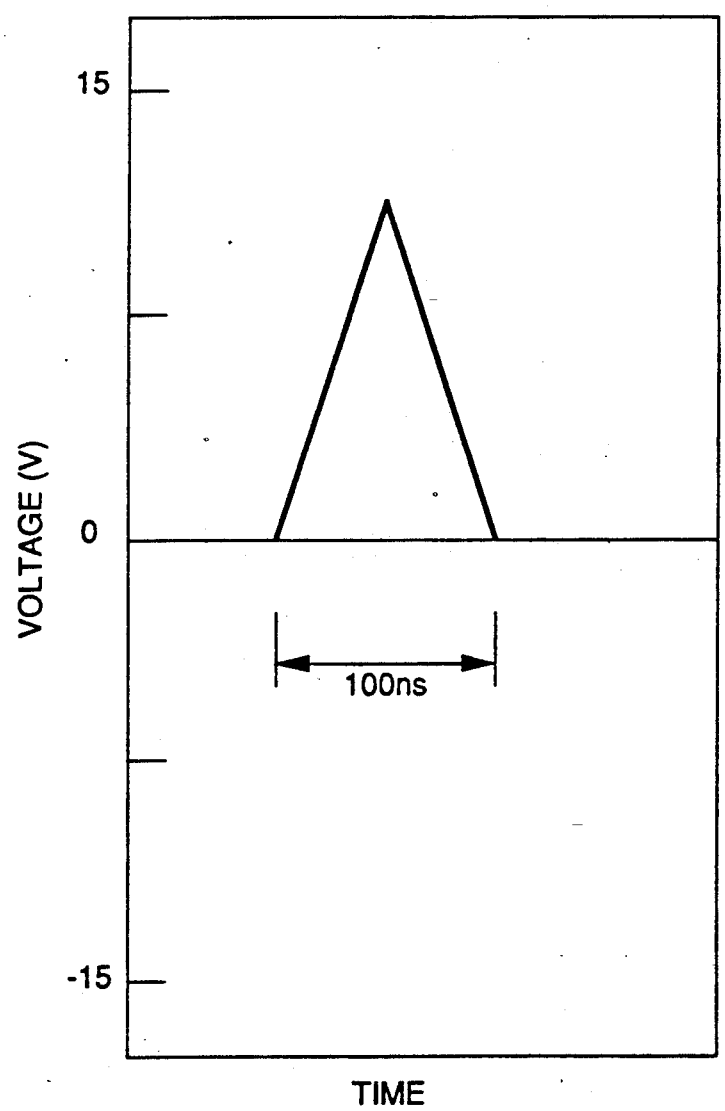
FIG. 11 is an illustration showing the waveform of the electric pulse necessary for returning the ON state site on the recording layer of the present invention to the OFF state.

When a pulse voltage shown in FIG. 11 between the probe electrode for recording and reproduction 802 and the gold electrode substrate 804 which transitions the recording site under the ON state to the OFF state is applied on the information recorded portion and then again reproduced, it was confirmed that the recorded state under the ON state applied with the pulse voltage shown in FIG. 11 was erased to be transitioned to the OFF state, namely the tunnel current returned to 1 nA.

Further, in the cases when the recording 802 of the recording medium 1 was changed from the polyimide 2-layer LB film to 4-, 6-, 8-layer polyimide LB film, it was confirmed that the same recording, reproduction and erasing as described above were possible.

In this connection, in Example 5, when the probe electrode was made one and both of positional detection and recording/reproduction were performed by time division by use of such one probe electrode, the bit error rate when the transfer speed during reproduction of the recorded image was made 1 Mbps was found to be $3 \times 10^{-5}$.

EXAMPLE 6

Recording and reproduction experiments were conducted in the same manner as in Example 5 except for using a 2-layer SOAZ LB film as the recording layer 801 in place of the polyimide 2-layer LB film in Example 5. In the following, the recording layer formation method is described. First, a benzene solution containing SOAZ at a concentration of 0.2 mg/ml dissolved therein was spread On an aqueous phase of 20° C. to form a monolayer film on the water surface. After waiting for evaporation of the solvent, the surface pressure of such monolayer film was enhanced to 20 mN/m, and further the above substrate was dipped and withdrawn gently at a speed of 3 mm/min. in the direction traversing the water surface to form a 2-layer built-up film of the SOAZ monolayer film on the electrode substrate 804.

As the result of the reproduction experiment, the bit error rate when the transfer speed was 1 Mbps was found to be $1 \times 10^{-5}$.

EXAMPLE 7

The same recording and reproduction experiments as in Example 5 were conducted except that recording layer 803 was formed by use of $CuTCNQF_4$ in place of the polyimide 2-layer LB film in Example 5.

For the applied voltage for recording, a rectangular pulse of 2 Vmax, 10 ns was employed, and the applied voltage for reproduction was made 0.1 V. On the other hand, for the applied voltage for erasing, a rectangular pulse of 5 Vmax, 100 ns was employed. As the result of the reproduction experiment, the bit error rate when the data transfer speed was made 1 Mbps was found to be $9 \times 10^{-6}$.

Next, the preparation method of the $CuTCNQF_4$ recording layer 803 is described. On the Au substrate electrode 804 were co-deposited Cu and $TCNQF_4$ according to the vacuum vapor deposition method to deposit 100 Å of $Cu + TCNQF_4$ layer (substrate temperature: room temperature). At this time, heating was effected by flowing a current value previously set that the vapor deposition speeds became Cu: 1 Å/s and $TCNQF_4$: 4 Å/s. As the result, a blue film by $CuTCNQF_4$ formation was confirmed to be deposited.

EXAMPLE 8

In Example 5, by use of the probe electrode for positional detection 803, the change amount in the thickness direction (Z-direction) of the recording was detected. That is, in scanning the probe electrode for positional detection 803 following the pattern in FIG. 9, the tunnel current changes periodically according to the gold atom arrangement. After the periodic components were removed with a filter, when the tunnel current is increased or reduced by more than 300 pA from the initial 1 nA on an average which is the standard, the distance between the probe electrode 803 and the gold electrode substrate 804 was adjusted occasionally as desired by use of the Z-axis direction fine adjustment control mechanism 807 and the servo circuit 808. At this time, the distance between the probe electrode for recording and reproduction 802 and the gold electrode substrate 804 was electrically equally adjusted. The above-described Z-direction displacement correction was performed in all the steps of recording, reproduction and erasing of information. As the result, the bit error rate when the data transfer speed was 1 Mbps was reduced to $4 \times 10^{-6}$.

Having described above the preparation method of a recording medium, any film forming method which can prepare an extremely uniform film can be employed, and the method in the Example is not limiting at all.

Also, the probe electrodes are not limited to two, but more probe electrodes may be employed. Also, as to the scanning pattern of the probe electrode and the period of the recording pit, the present Example is not limiting at all, but any method and a structure which can determine the recording position definitely relative to the positional can be used.

The present invention has the following effects.

(1) An entirely new information processing method capable of recording of by far higher density and higher precision as also compared with optical recording has been disclosed.

(2) The energy required for reproduction is small, and the consumption power is little.

(3) Since a recording bit or recording bit row is set at the position corresponding to the atomic arrangement by utilizing the atomic arrangement of a crystalline substrate, positional error during recording and reproduction of information can be made smaller, with the result that bit error rate could made smaller.

(4) As the result of separation of the probe electrode for detecting the atomic arrangement of the substrate from the probe electrode to be used for recording, reproduction and erasing of information, the probability of confusion in identification of positional information and recording information became markedly smaller, with the result that the recording and reproduction speeds of information were increased.

(5) By addition of a probe electrode for detecting the change in the thickness direction of the substrate, it has been shown that recording and reproduction of information can be done more surely.

What is claimed is:

1. An information processing method, comprising the steps of:
   providing a recording medium having a recording layer on an electrode substrate having a regular periodic structure within a plane;
   determining a recording position on the periodic structure of the substrate through the recording layer by use of a first probe electrode; and
   performing at least one of recording, reproducing and erasing of information by use of a second probe electrode at a desired position on the recording layer corresponding to the determined recording position.

2. An information processing method according to claim 1, wherein the steps of determining the recording position on the periodic structure of the substrate and performing at least one of recording, reproducing and erasing of the information each comprise applying a bias voltage between the probe electrodes and the substrate.

3. An information processing method according to claim 2, wherein the bias voltage applied between the first probe electrode and the substrate is different in amplitude than the bias voltage applied between the second probe electrode and the substrate.

4. An information processing method according to claim 2, wherein the bias voltage applied between the first probe electrode and the substrate is less than the bias voltage applied between the second probe electrode and the substrate.

5. An information processing method according to claim 1, wherein the step of performing at least one of recording, reproducing and erasing of information comprises applying a pulse voltage by the second probe electrode.

6. An information processing method according to claim 5, wherein the pulse voltage is a voltage in excess of a threshold value voltage which changes the electroconductivity of the recording layer.

7. An information processing method according to claim 1, wherein the periodic structure of the substrate is a structure based on an atomic arrangement.

8. An information processing method according to claim 1, further comprising providing an original point which becomes a standard on the recording layer and the substrate.

9. An information processing method according to claim 1, wherein the recording medium has an electric memory effect.

10. An information processing method, comprising the steps of:
providing a recording medium having a recording layer on an electrode substrate having a regular periodic structure within a plane;
determining a recording position on the periodic structure of the substrate through the recording layer by use of at least a first probe electrode of a plurality of electrodes; and
performing at least one of recording, reproducing and erasing of information at a desired position on the recording layer corresponding to the determined recording position by use of at least a second probe electrode.

11. An information processing method according to claim 10, wherein the periodic structure of the electrode substrate is based on an atomic arrangement.

12. An information processing method according to claim 10, further comprising applying a first bias voltage between the first probe electrode and the electrode substrate, and a second bias voltage between the second probe electrode and the electrode substrate.

13. An information processing method according to claim 12, wherein the first bias voltage applied between the first probe electrode and the electrode substrate is less than the second bias voltage applied between the second probe electrode and the electrode substrate.

14. An information processing method according to claim 10, wherein the step of performing at least one of recording, reproducing and erasing of information comprises applying a pulse voltage between the second probe electrode and the substrate.

15. An information processing method according to claim 14, wherein the pulse voltage is a voltage in excess of a threshold value voltage which changes electroconductivity of the recording layer.

16. An information processing method according to claim 10, wherein the recording medium has an electric memory effect.

17. An information processing method, comprising the steps of:
providing a recording medium having a recording layer on an electrode substrate having a regular periodic structure within a plane;
determining a recording position on the periodic structure of the substrate through the recording layer by use of at least a first probe electrode of a plurality of electrodes;
performing at least one of recording, reproducing and erasing of information at a desired set position on the recording layer corresponding to the determined recording position by use of at least a second probe electrode;
detecting the distance between the first probe electrode and the surface of the recording medium and the distance between the second probe electrode and the surface of the recording medium; and
controlling the distance between the second probe electrode and the recording medium surface based on the detected distance between the first probe electrode and the recording medium surface.

18. An information processing method according to claim 17, wherein the periodic structure of the electrode substrate is based on an atomic arrangement.

19. An information processing method according to claim 17, further comprising applying a first bias voltage between the first probe electrode and the electrode substrate, and a second bias voltage between the second probe electrode and the electrode substrate.

20. An information processing method according to claim 19, wherein the first bias voltage applied between the first probe electrode and the electrode substrate is less than the second bias voltage applied between the second probe electrode and the electrode substrate.

21. An information processing method according to claim 17, wherein the step of performing recording, reproducing and erasing of information comprises applying a pulse of voltage between the second probe electrode and the substrate.

22. An information processing method according to claim 21, wherein the pulse voltage is a voltage in excess of a threshold value voltage which changes electroconductivity of the recording layer.

23. An information processing method according to claim 17, wherein the recording medium has an electric memory effect.

24. An information processing device, comprising:
a recording medium comprising a recording layer on an electrode substrate having a regular periodic structure within a plane;
means for determining a recording position on the periodic structure of the electrode substrate through said recording layer by use of at least a first probe electrode opposing said recording medium; and
means for performing at least one of recording of information onto the recording layer, reproducing of recorded information and erasing of recorded information at a desired set position on the recording layer corresponding to the determined recording position by use of at least a second probe electrode opposing said recording medium.

25. An information processing device according to claim 24, wherein the periodic structure of the electrode substrate is based on an atomic arrangement.

26. An information processing device according to claim 24, further comprising means for applying a first bias voltage between the first probe electrode and the electrode substrate, and means for applying a second bias voltage between the second probe electrode and the electrode substrate.

27. An information processing device according to claim 26, wherein the first bias voltage applied between the first probe electrode and the electrode substrate is less than the second bias voltage applied between the second probe electrode and the electrode substrate.

28. An information processing device according to claim 24, further comprising a means for applying a pulse voltage between the second probe electrode and the electrode substrate.

29. An information processing device according to claim 24, wherein the recording medium has an electric memory effect.

30. An information processing device, comprising:
a recording medium comprising a recording layer on an electrode substrate having a regular periodic structure within a plane;
means for determining a recording position on the periodic structure of the electrode substrate through said recording layer by use of at least a first probe electrode opposing the surface of said recording medium;

means for performing at least one of recording of information onto the recording layer, reproducing of recorded information and erasing of recorded information at a desired set position on the recording layer corresponding to the determined recording position by use of at least a second probe electrode opposing the surface of said recording medium;

means for detecting the distance between the first probe electrode and the recording medium and the distance between the second probe electrode and the recording medium; and means for controlling the distance between the second probe electrode and the recording medium surface based on the detected distance between the first probe electrode and the recording medium.

31. An information processing device according to claim 30, wherein the periodic structure of the electrode structure is based on an atomic structure.

32. An information processing device according to claim 30, further comprising means for applying a first bias voltage between the first probe electrode and the electrode substrate, and means for applying a second bias voltage between the second probe electrode and the electrode substrate.

33. An information processing device according to claim 32, wherein the first bias voltage applied between the first probe electrode and the electrode substrate is less than the second bias voltage applied between the second probe electrode and the electrode substrate.

34. An information processing device according to claim 30, further comprising means for applying a pulse voltage between the second probe electrode and the electrode substrate.

35. An information processing device according to claim 30, wherein the recording medium has an electric memory effect.

36. An information processing method according to claim 1, wherein the step of performing at least one of recording, reproducing and erasing of the information comprises roster scanning the recording layer.

* * * * *

UNITED STATES PATENT AND TRADEMARK OFFICE
CERTIFICATE OF CORRECTION

PATENT NO. : 5,182,724       Page 1 of 7
DATED : January 26, 1993
INVENTOR(S) : YANAGISAWA ET AL.

It is certified that error appears in the above-indentified patent and that said Letters Patent is hereby corrected as shown below:

COLUMN 1

Line 13, "form" should read --forms--.

COLUMN 2

Line 32, "cIassified" should read --classified--;
Line 33, "in" should be deleted; and
Line 44, "primary" should read --± primary--.

COLUMN 4

Line 5, "&he" should read --the--; and
Line 52, "seotional" should read --sectional--.

COLUMN 5

Line 60, "A' of" should read --A'. Of--.

COLUMN 6

Line 25, "$J_T = \cdot\beta V/2\pi\lambda Z)\text{esp}(-2Z/\lambda)$    (1)" should read --$J_T = \beta V/2\pi Z)\exp(-2Z/\lambda)$    (1)--;
Line 28, "metal" should read --metal,--;
Line 29, "$h = \gamma/2\pi\gamma$: Planck's constant m:" should read --$h = \gamma/2\pi$   $\gamma$: Planck's constant, m:-- and "electron" should read --electron,--;
Line 30, "$B=e^2/h$ e:" should read --$\beta=e^2/h$   e:--; and
Line 31, "value" should read --value of--.

UNITED STATES PATENT AND TRADEMARK OFFICE
CERTIFICATE OF CORRECTION

PATENT NO. : 5,182,724
DATED : January 26, 1993
INVENTOR(S) : YANAGISAWA ET AL.

It is certified that error appears in the above-indentified patent and that said Letters Patent is hereby corrected as shown below:

COLUMN 7

Line 21, "a" should be deleted; and
Line 50, "$J_T(sub) \ J_T(ads).$" should read
--$J_T(sub)<J_T(ads)$--.

COLUMN 9

Line 8, "Silver," should read --silver,--; and
Line 39, "irisbypyridine" should read --trisbipyridine--.

COLUMN 10

Line 7, "arts," should read --art,--;
Line 27, "aeromatic" should read --aromatic--; and
Line 45, "Croconicmethine" should read --Croconic methane--
Following line 45, the first formula:

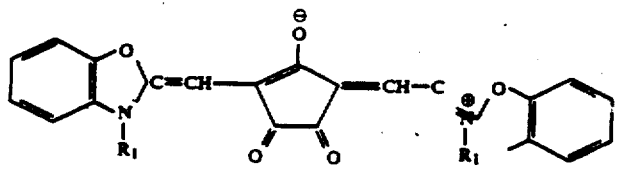

should read:

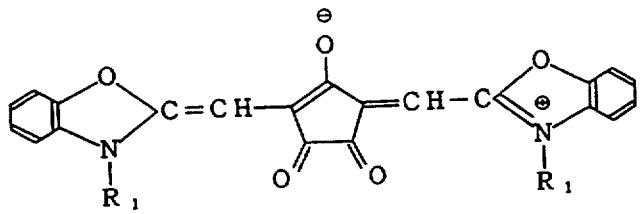

UNITED STATES PATENT AND TRADEMARK OFFICE
CERTIFICATE OF CORRECTION

PATENT NO. : 5,182,724

DATED : January 26, 1993

INVENTOR(S) : YANAGISAWA ET AL.

It is certified that error appears in the above-indentified patent and that said Letters Patent is hereby corrected as shown below:

COLUMN 16

Line 68, "1) polyimid," should read --1) polyimide,--.

COLUMN 17

Line 53, "$\pi$-electron" should read --a $\pi$-electron--.

COLUMN 18

Line 38, "constant" should read --constant,--; and
Line 45, "end" should read --and--.

COLUMN 19

Line 20, "e" should read --a--;
Line 38, "taking" should read --obtained or for taking--;
Line 46, "end" should read --and--; and
Line 66, "meral" should read --merals--.

COLUMN 20

Line 56, "Said" should read --This--;
Line 61, "[211] direction" should read --($\bar{2}$11) direction--; and
Line 65, "1 gm" should read --1 $\mu$m-- and "0.2 gm" should read --0.2 $\mu$m--.

UNITED STATES PATENT AND TRADEMARK OFFICE
CERTIFICATE OF CORRECTION

PATENT NO. : 5,182,724
DATED : January 26, 1993
INVENTOR(S) : YANAGISAWA ET AL.

It is certified that error appears in the above-indentified patent and that said Letters Patent is hereby corrected as shown below:

COLUMN 21

Line 7, "developer sputter-" should read --developer for exclusive use.  Etching was carried out by way of sputter- --;

Line 53, "[$\overline{2}$11] direction" should read --($\overline{2}$11) direction--;

Line 54, "[01$\overline{1}$] direction" should read --(01$\overline{1}$) direction--";

Line 59, "X'Y direc-" should read --X, Y direc- --;

Line 62, "A&" should read --At--; and

Line 64, "Standard" should read --standard--.

COLUMN 22

Line 7, "Control" should read --control--;

Line 20, "[$\overline{2}$11] direction" should read --($\overline{2}$11) direction--;

Line 22, "[01$\overline{1}$] direction" should read --(01$\overline{1}$) direction--";

Line 32, "&he" should read --the--.; and

Line 33, "recoding" should read --recording--.

UNITED STATES PATENT AND TRADEMARK OFFICE
CERTIFICATE OF CORRECTION

PATENT NO. : 5,182,724            Page 5 of 7
DATED : January 26, 1993
INVENTOR(S) : YANAGISAWA ET AL.

It is certified that error appears in the above-indentified patent and that said Letters Patent is hereby corrected as shown below:

COLUMN 23

Line 4, "XY" should read --X,Y--;

Line 23, "[001] direction" should read --$(00\bar{1})$ direction--;

Line 35, the right margin should be closed up;

Line 36, the left margin should be closed up;

Line 41, "substrate" should read --a substrate--;

Line 59, "[001] direction" should read --$(00\bar{1})$ direction--;

Line 60, "[110] direction." should read --(110) direction.--;

Line 63, "[001] direction" should read --$(00\bar{1})$ direction--; and

Line 64, "[110] direction." should read --(110) direction.--.

COLUMN 24

Line 48, "was" should read --were--;

Line 59, "(1, 0, $\bar{1}$) direction" should read --$(10\bar{1})$ direction--; and Line 60, ($\bar{1}$, 2, $\bar{1}$) direction." should read --$(\bar{1}2\bar{1})$ direction.--.

UNITED STATES PATENT AND TRADEMARK OFFICE
CERTIFICATE OF CORRECTION

PATENT NO. : 5,182,724
DATED : January 26, 1993
INVENTOR(S) : YANAGISAWA ET AL.

It is certified that error appears in the above-indentified patent and that said Letters Patent is hereby corrected as shown below:

COLUMN 26

Line 6, "electrode" should read --an electrode--;
Line 13, "1 × 10-M)," should read --1 × $10^{-3}$M),--;
Line 20, "m" should read --a--; and
Line 26, "face" should read --surface--.

COLUMN 27

Line 29, "gold" should read --gold.--;
Line 30, "(1, 0, $\bar{1}$) direction" should read --($10\bar{1}$) direction--;
Line 31, "($\bar{1}$, 2, $\bar{1}$) direc-" should read --($\bar{1}2\bar{1}$) direc- --;
Line 61, "(1, 0, $\bar{1}$) direction" should read --($10\bar{1}$) direction--; and
Line 62, "($\bar{1}$, 2, $\bar{1}$) direction" should read --($\bar{1}2\bar{1}$) direction- --.

COLUMN 28

Line 12, "formed" should read --performed--; and
Line 64, "On" should read --on--.

UNITED STATES PATENT AND TRADEMARK OFFICE
CERTIFICATE OF CORRECTION

PATENT NO. : 5,182,724
DATED : January 26, 1993
INVENTOR(S) : YANAGISAWA ET AL.

It is certified that error appears in the above-indentified patent and that said Letters Patent is hereby corrected as shown below:

COLUMN 29

Line 28, "that" should read --so that--.

COLUMN 32

Line 57, "a means" should read --means--.

COLUMN 33

Line 23, "structure" should read --substrate--.

Signed and Sealed this

Eighth Day of August, 1995

Attest:

BRUCE LEHMAN

*Attesting Officer*  *Commissioner of Patents and Trademarks*